US012682196B2

(12) United States Patent
Yeomans et al.

(10) Patent No.: US 12,682,196 B2
(45) Date of Patent: ***Jul. 14, 2026

(54) SYSTEM AND METHOD FOR DYNAMIC MULTI-LEVEL SECURITY IN HIGH-CAPACITY OPTICAL CODES

(71) Applicant: AtomBeam Technologies Inc., Moraga, CA (US)

(72) Inventors: Charles Yeomans, Orinda, CA (US); Edward Woolen, Cleburne, TX (US); Etienne Coulon, Saint-Jorioz (FR); Brian Galvin, Silverdale, WA (US)

(73) Assignee: ATOMBEAM TECHNOLOGIES INC., Moraga, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/209,804

(22) Filed: May 16, 2025

(65) Prior Publication Data

US 2025/0384235 A1 Dec. 18, 2025

Related U.S. Application Data

(63) Continuation-in-part of application No. 19/012,903, filed on Jan. 8, 2025, now Pat. No. 12,307,325, which (Continued)

(51) Int. Cl.
*G06K 19/06* (2006.01)
*G06F 21/60* (2013.01)

(52) U.S. Cl.
CPC ..... *G06K 19/06046* (2013.01); *G06F 21/602* (2013.01); *G06F 2221/2101* (2013.01)

(58) Field of Classification Search
CPC ............ G06K 7/10118; G06K 7/1417; G06K 19/06037; G06K 19/00; G06K 19/06; G06F 21/602

(Continued)

(56) References Cited

U.S. PATENT DOCUMENTS

2005/0132194 A1 6/2005 Ward
2011/0213700 A1 9/2011 Sant'Anselmo
(Continued)

*Primary Examiner* — Edwyn Labaze
(74) *Attorney, Agent, or Firm* — GALVIN PATENT LAW LLC; Brian R. Galvin; Erin L. Johnston

(57) ABSTRACT

A system and method for encoding and decoding optical codes with context-aware, multi-level security. Input data is classified into security levels with associated context sensitivity requirements. The system compresses data using public and private codebooks based on security classifications, then generates optical codes incorporating both compressed data and context requirements. When scanned, the system collects environmental contextual data (location, network environment, device security, user behavior), analyzes it against embedded context requirements, and dynamically determines which security levels are accessible in the current environment. Only authorized security levels are decoded using appropriate codebooks based on both user credentials and current contextual factors. This approach enables fine-grained, context-sensitive access control that adapts to changing environments while maintaining the compression benefits and capacity advantages of the multi-level security framework.

16 Claims, 17 Drawing Sheets

Related U.S. Application Data is a continuation-in-part of application No. 18/743, 126, filed on Jun. 14, 2024, now Pat. No. 12,204,968.

(58) Field of Classification Search

USPC ................. 235/494, 462.1, 462.09, 487, 375

See application file for complete search history.

(56) References Cited

U.S. PATENT DOCUMENTS

| | | |
|---|---|---|
| 2016/0085955 A1 | 3/2016 | Lerner |
| 2017/0257358 A1 | 9/2017 | Ebrahimi et al. |
| 2018/0247386 A1 | 8/2018 | Zheng et al. |
| 2019/0253254 A1 | 8/2019 | Brownlee et al. |
| 2021/0042112 A1* | 2/2021 | Covaci .................. G06F 9/3836 |

\* cited by examiner

800

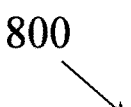

```
┌─────────────────────────────────────────────┐
│         Obtain input data to be encoded       │
│                     802                        │
└─────────────────────────────────────────────┘
                      │
                      ▼
┌─────────────────────────────────────────────┐
│ Separate the data into a public data portion  │
│          and a private data portion            │
│                     804                        │
└─────────────────────────────────────────────┘
                      │
                      ▼
┌─────────────────────────────────────────────┐
│ Compute hash of public data portion and        │
│          private data portion                  │
│                     806                        │
└─────────────────────────────────────────────┘
                      │
                      ▼
┌─────────────────────────────────────────────┐
│ Compress the public data portion using a       │
│              public codebook                   │
│                     808                        │
└─────────────────────────────────────────────┘
                      │
                      ▼
┌─────────────────────────────────────────────┐
│ Compress the private data portion using a      │
│             private codebook                   │
│                     810                        │
└─────────────────────────────────────────────┘
                      │
                      ▼
┌─────────────────────────────────────────────┐
│ Combine public and private compressed          │
│   portions and hash into a combined data string│
│                     812                        │
└─────────────────────────────────────────────┘
```

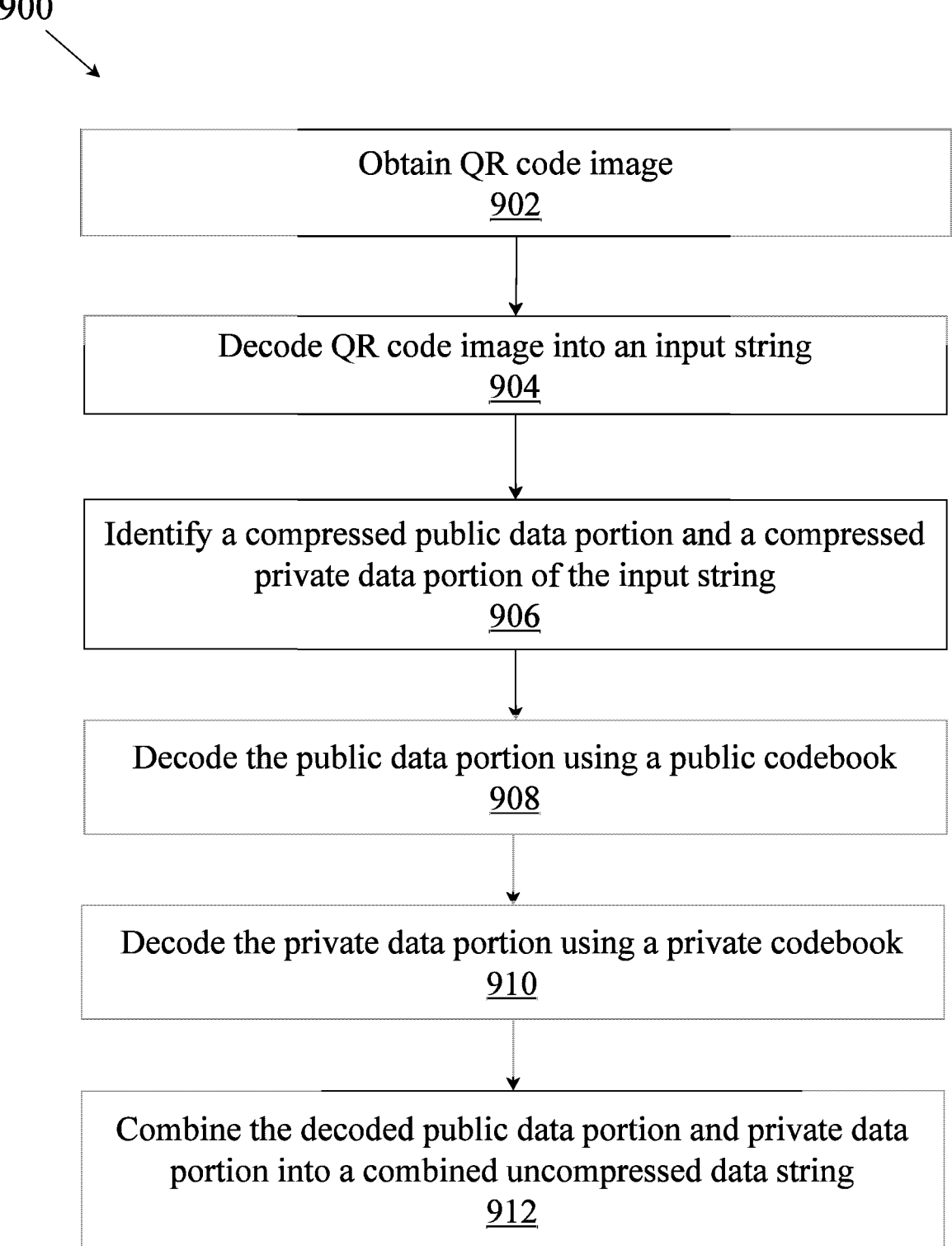

Obtain QR code image
902

Decode QR code image into an input string
904

Identify a compressed public data portion and a compressed
private data portion of the input string
906

Decode the public data portion using a public codebook
908

Decode the private data portion using a private codebook
910

Combine the decoded public data portion and private data
portion into a combined uncompressed data string
912

Fig. 9

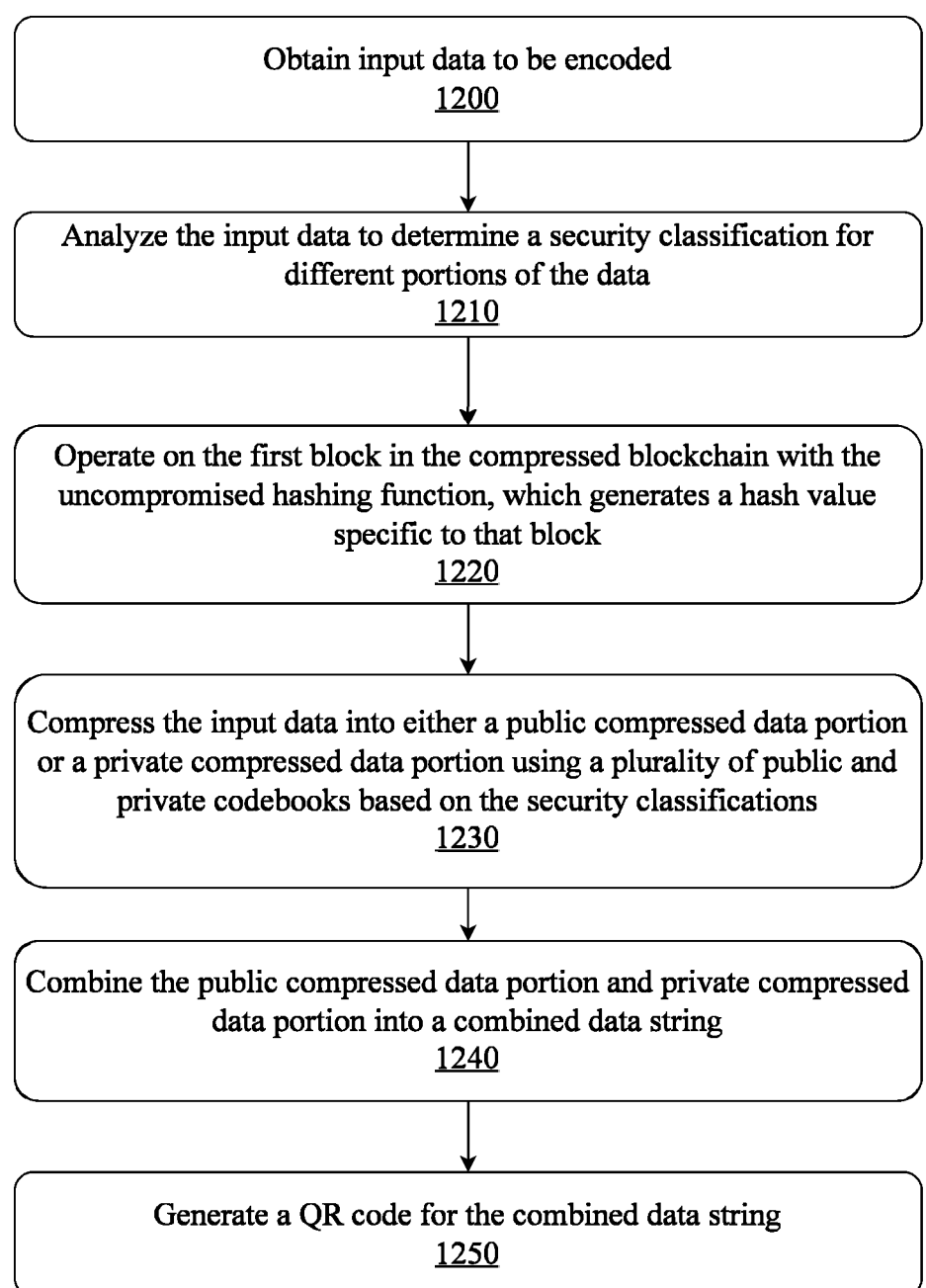

Obtain input data to be encoded
1200

Analyze the input data to determine a security classification for different portions of the data
1210

Operate on the first block in the compressed blockchain with the uncompromised hashing function, which generates a hash value specific to that block
1220

Compress the input data into either a public compressed data portion or a private compressed data portion using a plurality of public and private codebooks based on the security classifications
1230

Combine the public compressed data portion and private compressed data portion into a combined data string
1240

Generate a QR code for the combined data string
1250

Fig. 12

Decoding
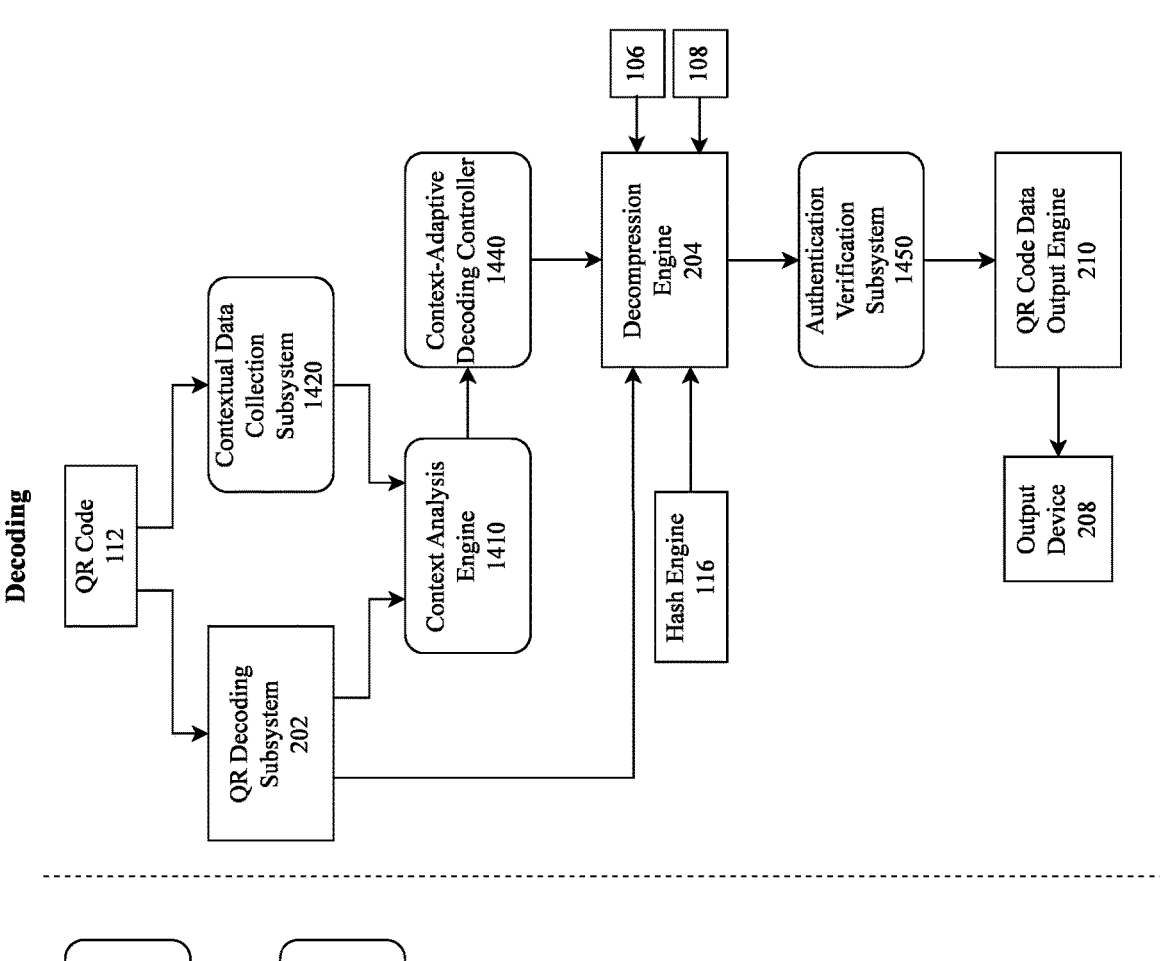
Encoding
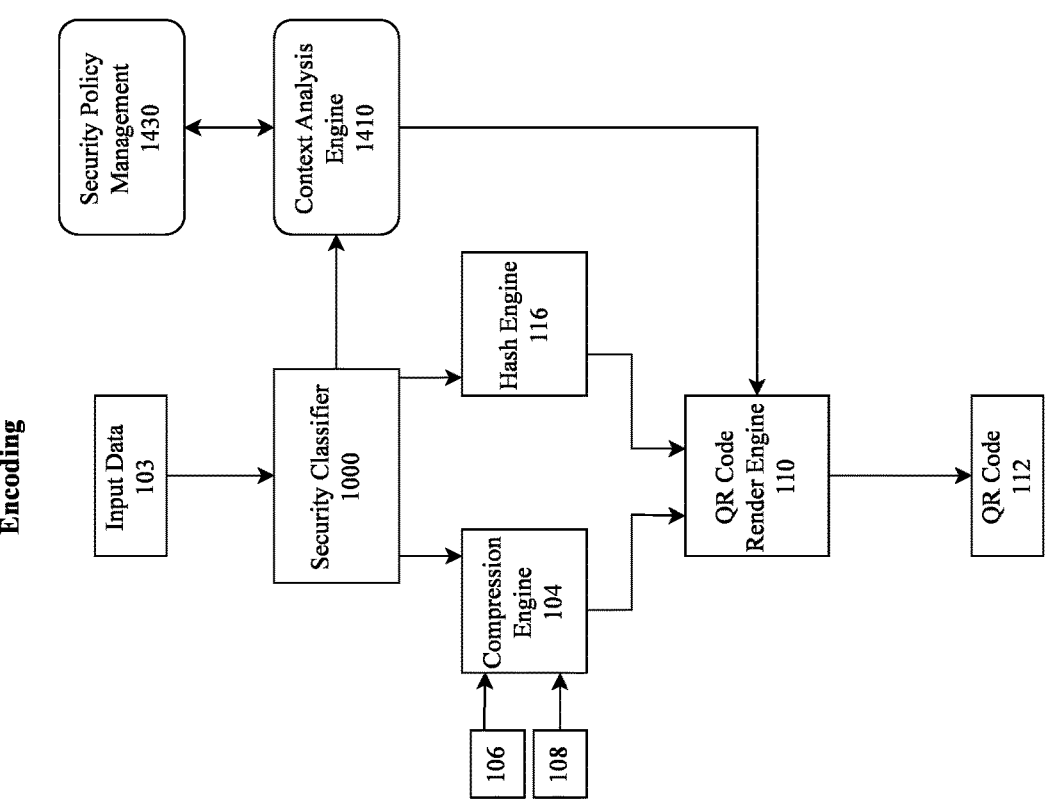
FIG. 14

SYSTEM AND METHOD FOR DYNAMIC MULTI-LEVEL SECURITY IN HIGH-CAPACITY OPTICAL CODES

CROSS-REFERENCE TO RELATED APPLICATIONS

Priority is claimed in the application data sheet to the following patents or patent applications, each of which is expressly incorporated herein by reference in its entirety:
Ser. No. 19/012,903
Ser. No. 18/743,126

BACKGROUND OF THE INVENTION

Field of the Art

The present invention is in the field of optical codes, and more particularly is directed to improvements in capacity, data compression, and multi-level security within optical encoding systems—including, but not limited to, quick response (QR) codes, barcodes, Data Matrix codes, and Aztec codes. More specifically, the invention relates to context-adaptive access control and dynamic security level enforcement based on environmental, device, and user-specific contextual data, thereby enabling fine-grained, situationally-aware access to encoded information.

Discussion of the State of the Art

Barcodes and other optical codes play a critical role in modern society, offering a range of benefits across industries including retail, logistics, healthcare, finance, and mobile commerce. These optical codes—such as QR codes, Data Matrix codes, and Aztec codes—enable efficient inventory tracking, asset monitoring, identity verification, and transaction processing. They are increasingly deployed in mobile devices and integrated into digital workflows, enhancing convenience and operational efficiency. Common use cases include supply chain tracking, patient identification in healthcare, event ticketing, and secure data transmission in enterprise systems.

Optical codes are typically scanned using a laser scanner, camera, or mobile device, which captures and processes the image to extract embedded information. Advances in mobile imaging and decoding software have enabled widespread use of optical codes, even on consumer-grade devices. However, traditional optical encoding systems remain limited in their ability to securely manage sensitive information or adapt access based on environmental or contextual factors. Conventional systems generally apply static access controls, lack fine-grained security tiering, and do not assess contextual risk at the time of scan—such as the scanning device's security state, the network environment, or the user's behavior and location.

What is needed is an improved optical encoding system that not only increases data capacity and supports multi-level security classifications, but also dynamically evaluates contextual data at the time of decoding to determine appropriate access permissions. Such a system would enable fine-grained, real-time access control based on situational factors, providing enhanced security and policy compliance for sensitive or regulated information.

SUMMARY OF THE INVENTION

Accordingly, the inventor has conceived and reduced to practice a system and method for dynamic security level adaptation in high-capacity optical code encoding and decoding systems. This system extends prior multi-level security frameworks by introducing context-aware access control based on environmental, device-level, and behavioral data collected at the time of decoding. The invention enables optical codes, such as QR codes and other matrix symbologies, to dynamically enforce access policies based on real-time assessments of the scanning context, thereby improving data protection, regulatory compliance, and user-specific access control. The system supports fine-grained, adaptive access decisions across multiple security tiers by embedding contextual policy metadata within the encoded optical code and selectively decoding data only when contextual criteria are satisfied.

According to an embodiment, a computer system is configured to encode and decode multi-level security optical codes using both security classifications and contextual sensitivity requirements. The system obtains input data, classifies portions of the data into different security levels, and determines the contextual conditions under which each portion should be accessible. It compresses the data using public and private codebooks according to these classifications, and then generates an optical code (such as a QR code) that embeds both the compressed data and the contextual access policies. During decoding, the system captures contextual data such as location, network security, device attributes, and user behavior. It evaluates this information against the embedded access policies and selectively decodes only the data for which contextual access is authorized.

According to an aspect of an embodiment, the contextual data evaluated by the system may include one or more of: GPS location data, network parameters (e.g., VPN usage or Wi-Fi security protocols), device security attributes (e.g., OS version, biometric authentication status), and behavioral patterns such as scan history and interaction timing.

According to an aspect of an embodiment, the system may incorporate a hashing mechanism to authenticate decoded data. A cryptographic hash value is computed during encoding based on the data and its associated context sensitivity rules, and this hash is embedded in the optical code. Upon decoding, the system recomputes the hash using the retrieved data and context, and compares it against the embedded value to confirm data integrity and authorized access. According to an aspect of an embodiment, the system may use a weighted scoring algorithm to evaluate multiple contextual attributes and compute a composite security confidence level. This score determines which security tiers the scanning device is permitted to access under the current conditions.

According to an aspect of an embodiment, the system may retrieve public and private codebooks identified in the encoded optical code and use them to decompress data only after contextual authorization is confirmed. These codebooks may be stored locally or retrieved over a network connection depending on policy and availability.

According to an aspect of an embodiment, the system may monitor contextual conditions during a user session and dynamically adjust access to security levels in real time. If contextual parameters change—such as a change in network connection or a failed security check—the system may downgrade or revoke access accordingly.

According to an aspect of an embodiment, the system may maintain an audit log of access decisions, including which contextual conditions were evaluated, which security levels were accessed, and any authentication outcomes. This log can support compliance auditing and threat analysis.

According to an aspect of an embodiment, the optical code may take the form of a QR code, barcode, Data Matrix code, or Aztec code, and the system is designed to work with any of these symbologies depending on application requirements.

BRIEF DESCRIPTION OF THE DRAWING FIGURES

FIG. 8 is a flow diagram illustrating an exemplary method for encoding information into a QR code, according to an embodiment.

FIG. 9 is a flow diagram illustrating an exemplary method for decoding a QR code, according to an embodiment.

FIG. 12 is a flow diagram illustrating an exemplary method for encoding and compressing multi-level security, high-capacity QR codes.

FIG. 14 is a block diagram illustrating exemplary architecture of dynamic security level system.

Figure 1:
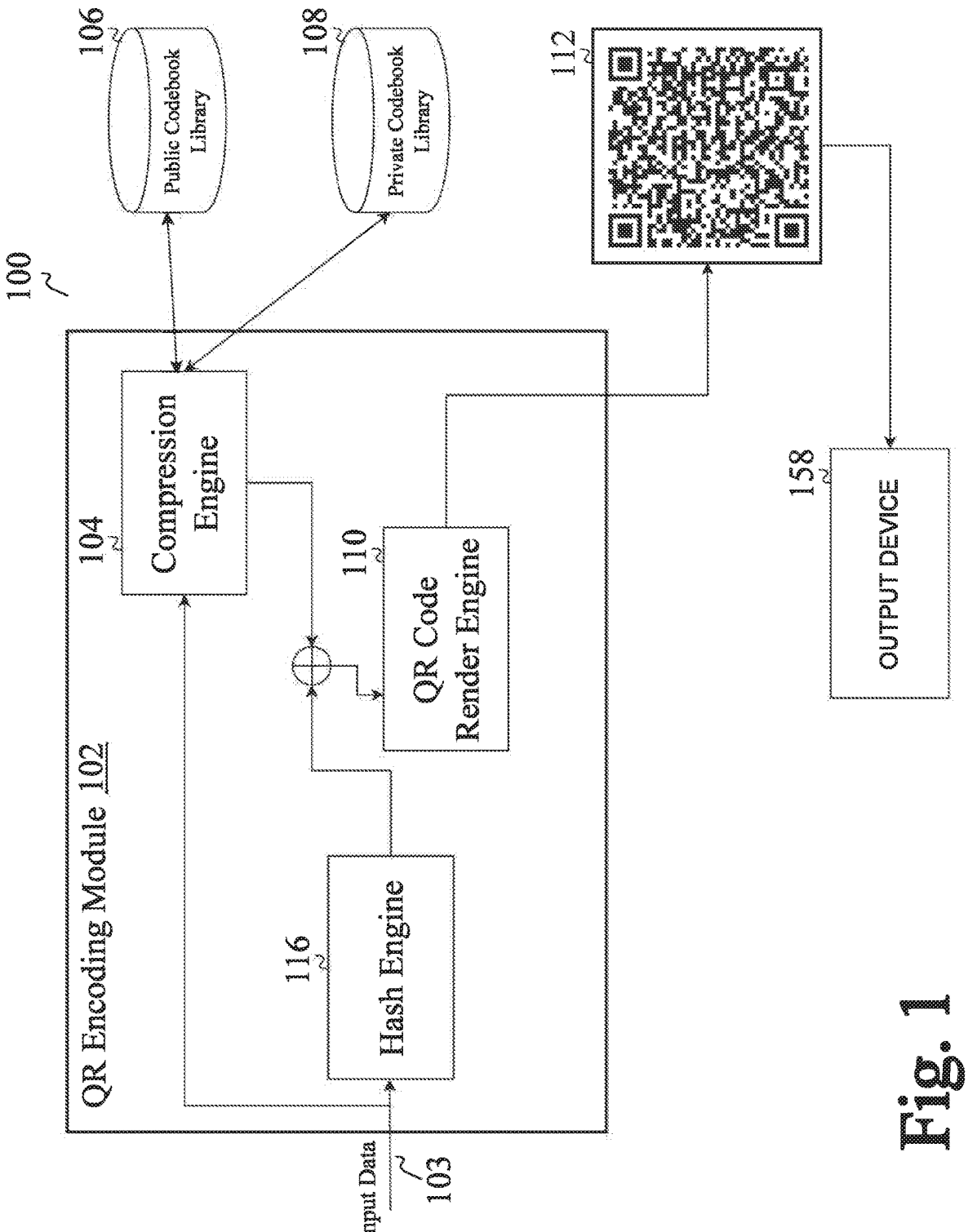
FIG. 1 is a diagram showing an exemplary system architecture, according to an embodiment, utilizing a QR encoding module.

The drawings are not necessarily to scale. The drawings are merely schematic representations, not intended to portray specific parameters of the disclosed embodiments. The drawings are intended to depict only typical embodiments of the invention, and therefore should not be considered as limiting in scope.

DETAILED DESCRIPTION OF THE INVENTION

The inventor has conceived a system and method for dynamic security level adaptation in high-capacity optical codes. This system extends previously disclosed techniques for compressing and encoding multi-level secure data by adding a new capability: real-time, context-aware access control. Rather than relying solely on predefined user credentials or static device permissions, this invention evaluates dynamic environmental and behavioral context to determine whether access to certain levels of encoded data should be granted or restricted at the time the code is scanned.

In various embodiments, the system introduces several new components that work in conjunction with the existing encoding and decoding infrastructure. These new components enable the system to evaluate contextual data from the environment, device, and user behavior, and apply security policies that map this context to permissible access levels.

The system includes a component that collects contextual information from the scanning device and its environment. This may include physical data such as geographic location, network connectivity parameters, and device security posture. For example, a device may report whether it is connected to a secure corporate network or a public Wi-Fi access point, whether it has passed biometric verification, or whether it is operating with the latest software security patches. The system may also observe behavioral context, such as how the user interacts with the device or how frequently they have scanned codes in similar contexts.

A separate component processes this contextual data and evaluates it against a set of predefined security policies. These policies define what contextual conditions must be met in order for specific security levels of the optical code to be accessed. For instance, a particular segment of the encoded data might only be accessible if the device is located within a known geographic region, connected to a corporate VPN, and authenticated with biometric credentials. The policy engine evaluates the available context and computes a confidence level or access decision accordingly.

The system also includes a policy management infrastructure that allows administrators to define, manage, and distribute context-based security rules. These rules can be hierarchical—applying globally, per user group, or per individual—and may be defined using logical combinations of contextual parameters. For instance, a policy might require either a trusted device or a secure network, but not necessarily both. Policy changes may be versioned and logged, with real-time synchronization across scanning endpoints.

Once a QR code or other optical symbol is scanned, the system analyzes the embedded data to identify what security levels are present and what contextual requirements are associated with each. It then evaluates the current context to determine which levels are accessible. Based on this evaluation, the system selectively decompresses and displays only the portions of the encoded data that are authorized under the current conditions.

In some embodiments, the system also verifies the authenticity of the contextual data using cryptographic techniques. For example, contextual parameters may be digitally signed at the point of collection, cross-validated through independent data sources, or evaluated using reputation scores. The system may also perform anomaly detection to identify unexpected context patterns, such as a sudden geographic jump or repeated scan attempts under slightly varied conditions. These techniques help ensure that access decisions are based on trustworthy context information.

Additionally, the system may incorporate continuous authentication, allowing it to monitor contextual stability throughout an active session. If conditions change—such as a VPN connection being lost or the device leaving a geofenced region—the system may revoke access to sensitive data or degrade access gracefully. In contrast to binary access models, this approach allows for nuanced, real-time control over what data is available and under what circumstances.

The architecture supports interoperability with existing components described in the base patent. The original security classification engine is extended to include context sensitivity definitions for each data segment. Compression and decompression engines remain responsible for encoding and decoding the data, but now operate only after contextual access is confirmed. Codebooks are enhanced with metadata describing their contextual restrictions, and the hashing component is expanded to include verification of contextual integrity alongside data integrity.

This dynamic, context-aware architecture allows optical codes to serve not only as data carriers but also as gatekeepers, enabling or restricting access in real time based on situational awareness. The result is a highly adaptive, secure, and flexible encoding system suitable for environments where access needs to be finely tuned to both organizational policy and real-world conditions.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

The term "bit" refers to the smallest unit of information that can be stored or transmitted. It is in the form of a binary digit (either 0 or 1). In terms of hardware, the bit is represented as an electrical signal that is either off (representing 0) or on (representing 1).

The term "hash" refers to a mathematical function that converts input data into a fixed-size string of bytes or characters, which typically represents a shorter, more manageable version of the input. This output is commonly referred to as a "hash value," "hash code," or simply "hash."

The term "QR Code" refers to a quick response code, which is a two-dimensional barcode that offers high-speed and omni-directional reading, and has a large information capacity, high reliability, and is compatible with diverse characters and image information.

The term "codebook" refers to a dictionary or table that maps input symbols (such as characters or pixels) to specific codewords. Codewords are typically binary sequences (0s and 1s) that represent the input symbols in a more compact form.

Multi-Level Security in High-Capacity Optical Codes Conceptual Architecture

FIG. 1 is a diagram showing an exemplary system architecture, according to an embodiment, utilizing a QR encoding module. The system 100 includes a QR encoding module 102 that can include functions and/or instructions for encoding input data 103 into a QR code 112. In embodiments, the input data includes public data and private data. In embodiments, QR encoding module 102 includes a hash engine 116, and the public data and private data is input to both the hash engine 116, and the compression engine 104. The hash engine 116 can include functions, instructions, and/or hardware to compute a hash of the input data. In embodiments, the hash engine 116 operates on a concatenation of the public data and the private data. In embodiments, the hash engine 116 generates an md5 hash value, or a SHA1 hash value. Other hashing schemes may be used in one or more embodiments. The compression engine 104 can include functions, instructions, and/or hardware to compress the input data 103 using a public codebook and/or a private codebook. In embodiments, a public codebook may be retrieved via a computer network from public codebook library 106. In embodiments, a private codebook may be retrieved via a computer network from private codebook library 108. In embodiments, QR encoding module 102 includes a QR Code Render engine 110, that can include functions and/or instructions for encoding the output of the compression engine 104, along with the hash values from hash engine 116, into a QR code 112. In one or more embodiments, the QR Code Render engine 110 may render QR code 112 according to ISO/IEC 18004, ISO/IEC 21471, JIS X 0510, and/or other suitable standards. In one or more embodiments, the QR code is sent to an output device 158. In one or more embodiments, the output device 158 can include an electronic display, printer, and/or other suitable output device. Thus, embodiments can include rendering the QR code on an electronic display.

Figure 2:
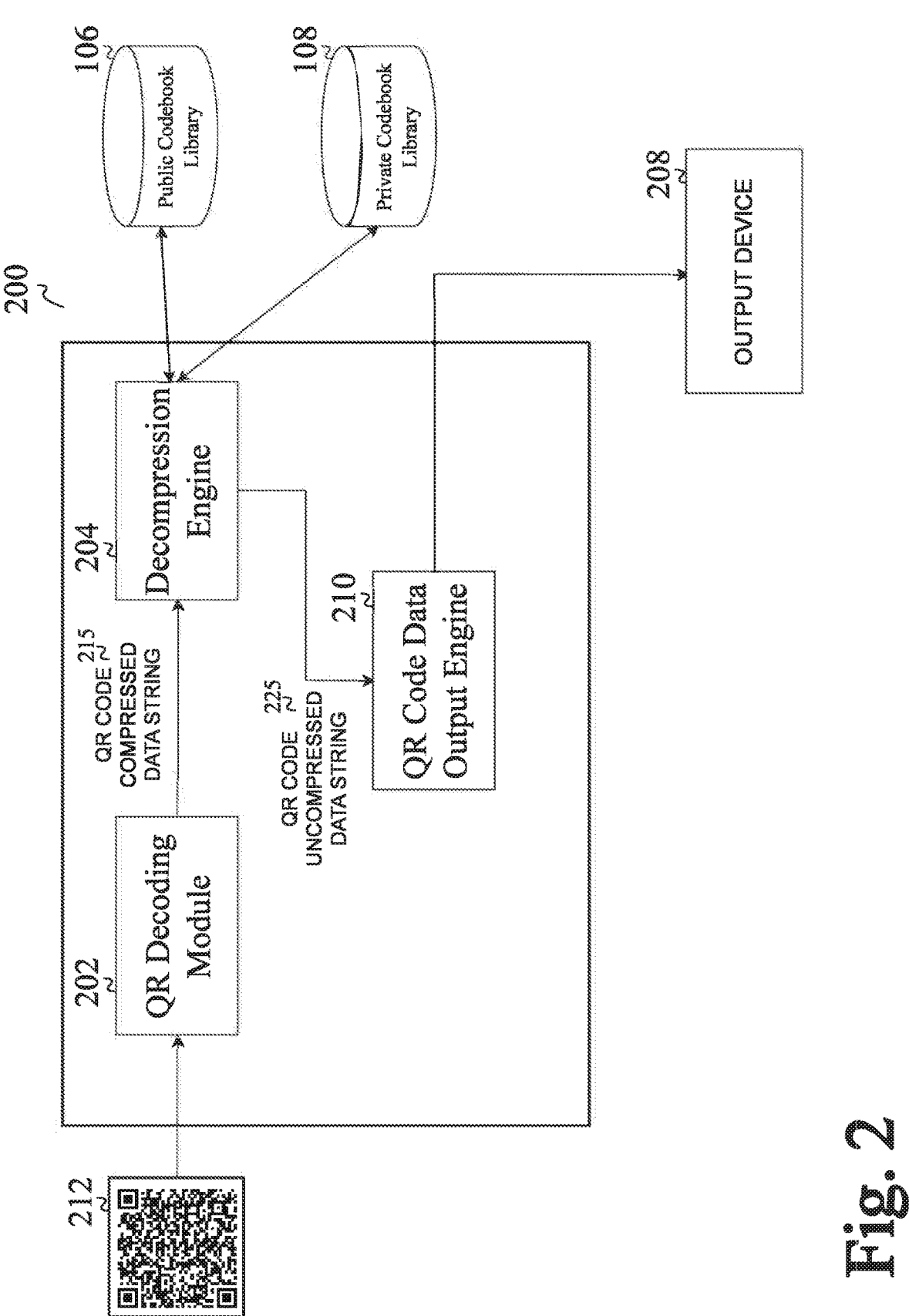
FIG. 2 is a diagram showing an exemplary system architecture, according to an embodiment, utilizing a QR decoding module.

FIG. 2 is a diagram showing an exemplary system architecture, according to an embodiment, utilizing a QR decoding module 202. The QR decoding module 202 can include functions and/or instructions for decoding QR code 212 into a QR code compressed data string 215. The QR code compressed data string 215 is input to decompression engine 204. The decompression engine 204 can include functions and/or instructions for decompressing the QR code compressed data string. In embodiments, decompression engine 204 can include functions and/or instructions for accessing a public codebook from public codebook library 106, and/or accessing a private codebook from private codebook library 108. In embodiments, the public codebook library 106 and/or the private codebook library 108 may be connected to a QR code reading device (e.g., a smartphone) via a computer network, such as a local area network (LAN), wide area network (WAN), and/or other suitable network. In one or more embodiments, the network includes the Internet. The decompression engine 204 outputs QR code uncompressed data string 225. The QR code uncompressed data string 225 is input to QR code data output engine 210, which outputs the QR code uncompressed data string to an output device 208. In one or more embodiments, the output device 208 can include an electronic display, printer, and/or other suitable output device.

Figure 3:
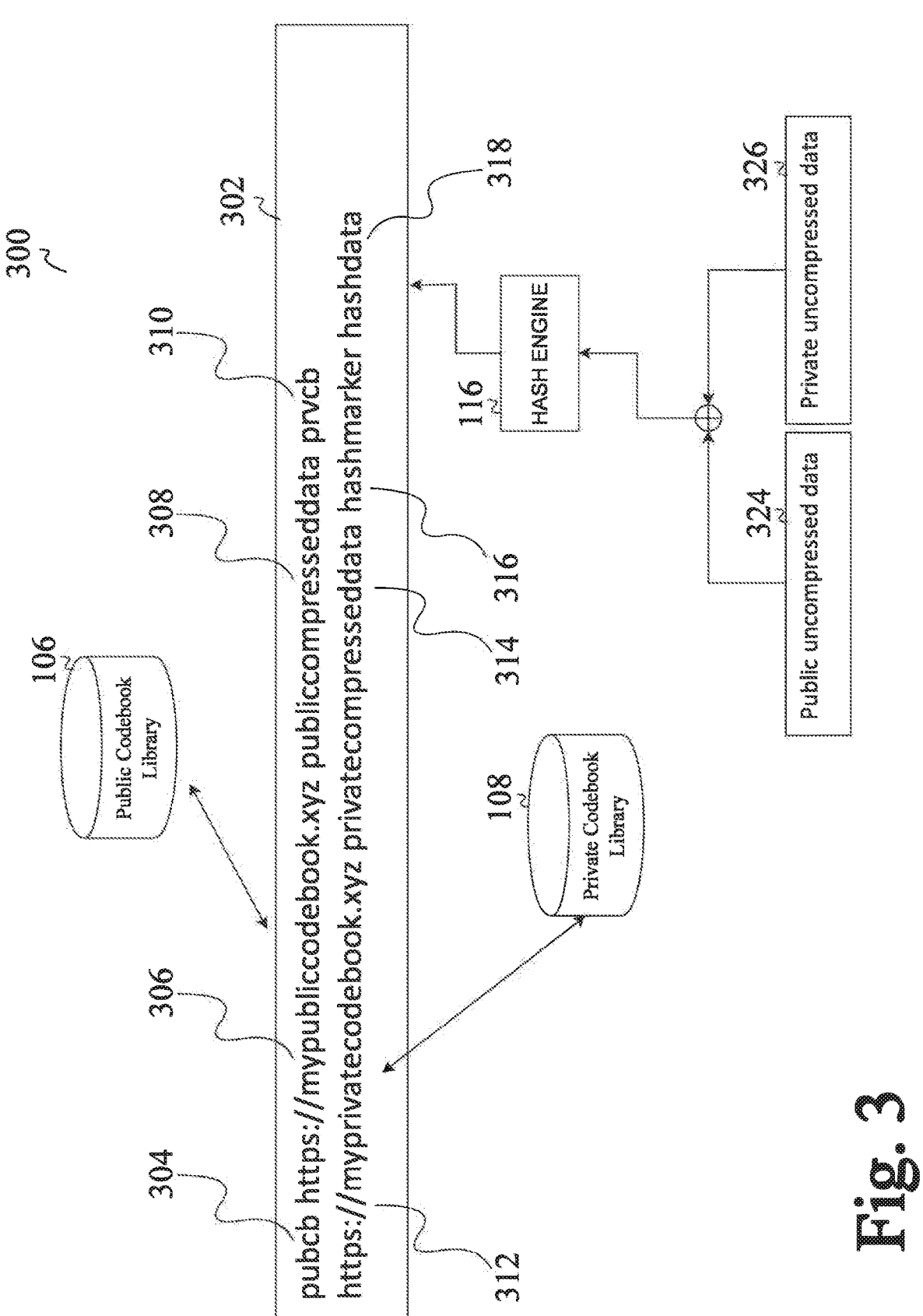
FIG. 3 is a diagram showing an exemplary compressed data format, according to an embodiment.

FIG. 3 is a diagram 300 showing an exemplary compressed data format, according to an embodiment. Diagram 300 includes an exemplary QR code compressed data string 302. The QR code compressed data string 302 can be comprised of characters encoded as ASCII, UTF-8, Unicode, or other suitable format. The QR code compressed data string 302 can include various markers to delimit multiple fields. In one or more embodiments, the markers can include a special character, followed by a preset number of alphanumeric characters. As an example, a delimiter can include an asterisk followed by a four-character alphanumeric code. Other combinations of characters may be used as markers in one or more embodiments. The QR code compressed data string 302 can include public codebook marker 304, indicating that the following data pertains to a public codebook Uniform Resource Locator (URL) 306. The public codebook Uniform Resource Locator (URL) 306 may be used to access a public codebook from public codebook library 106.

The QR code compressed data string 302 can include private codebook marker 310, indicating that the following data pertains to a private codebook Uniform Resource Locator (URL) 312. The private codebook Uniform Resource Locator (URL) 312 may be used to access a private codebook from private codebook library 108. The QR code compressed data string 302 can include hash marker 316, indicating that the following data pertains to hash data 318. The hash data 318 may be used to encode the public uncompressed data 324 and/or private uncompressed data 326 as a hash value, computed by hash engine 116. In embodiments, the public uncompressed data 324 and the private uncompressed data 326 are concatenated into a single string prior to performing a hash on it. In one or more embodiments, the hash value can be computed using an md5 hash, SHA1 hash, SHA256 hash, or other suitable hashing technique. In one or more embodiments, the hash data 318 is used to confirm that the compressed data is properly decompressed. In embodiments, the QR decoding device (e.g., a laser scanner, smartphone, or the like) computes a hash value of the data that was uncompressed on the device, and compares it to the hash data 318, with a match indicating correct decompression, and a mismatch indicating an error in decompressing the data. In this way, disclosed embodiments provide confirmation that the compressed data is decompressed with the correct codebook(s).

Figure 4:
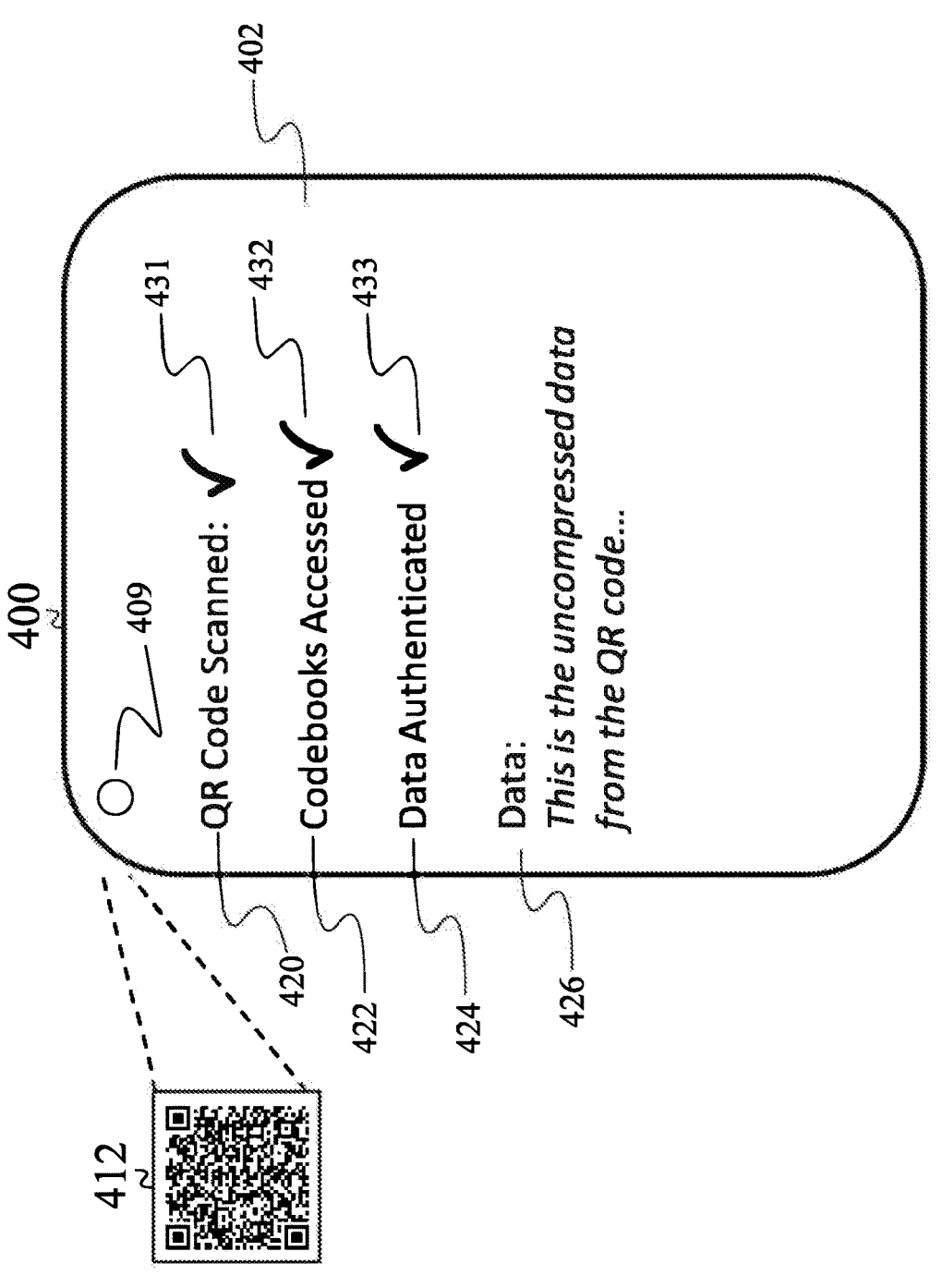
FIG. 4 is a diagram showing an exemplary user interface indicating successful QR decoding, according to an embodiment.

FIG. 4 is a diagram showing an exemplary user interface indicating successful QR decoding, according to an embodiment. Electronic device 400 may be a smartphone, tablet computer, laser scanner, or other suitable electronic device for scanning a QR code of disclosed embodiments. The electronic device includes an electronic display 402. The electronic device 400 further includes a camera 409, which is used to obtain an image of a QR code 412 in a digital format, which is loaded into a memory of the electronic device 400 for further processing. In the embodiment shown in FIG. 4, various steps of the QR decoding process are shown, along with a corresponding status indicator. At field 420, there is an indication of a successful scanning (image acquisition), and a corresponding success indicator 431. At field 422, there is an indication of a successful codebook access (successful retrieval of public codebook(s) and/or private codebook(s)), and a corresponding success indicator 432. At field 424, there is an indication of a successful data authentication (e.g., matching of computed hash and the hash included in the QR code compressed data string), and a corresponding success indicator 433. At 426, the uncompressed data from the QR code is rendered. Thus, embodiments can include identifying a hash within the input string; computing a concatenation of the decoded public data portion and the decoded private data portion; computing a hashed value of the concatenation; and in response to the hash within the input string matching the hashed value, setting a status of the uncompressed data string to authenticated.

Figure 5:
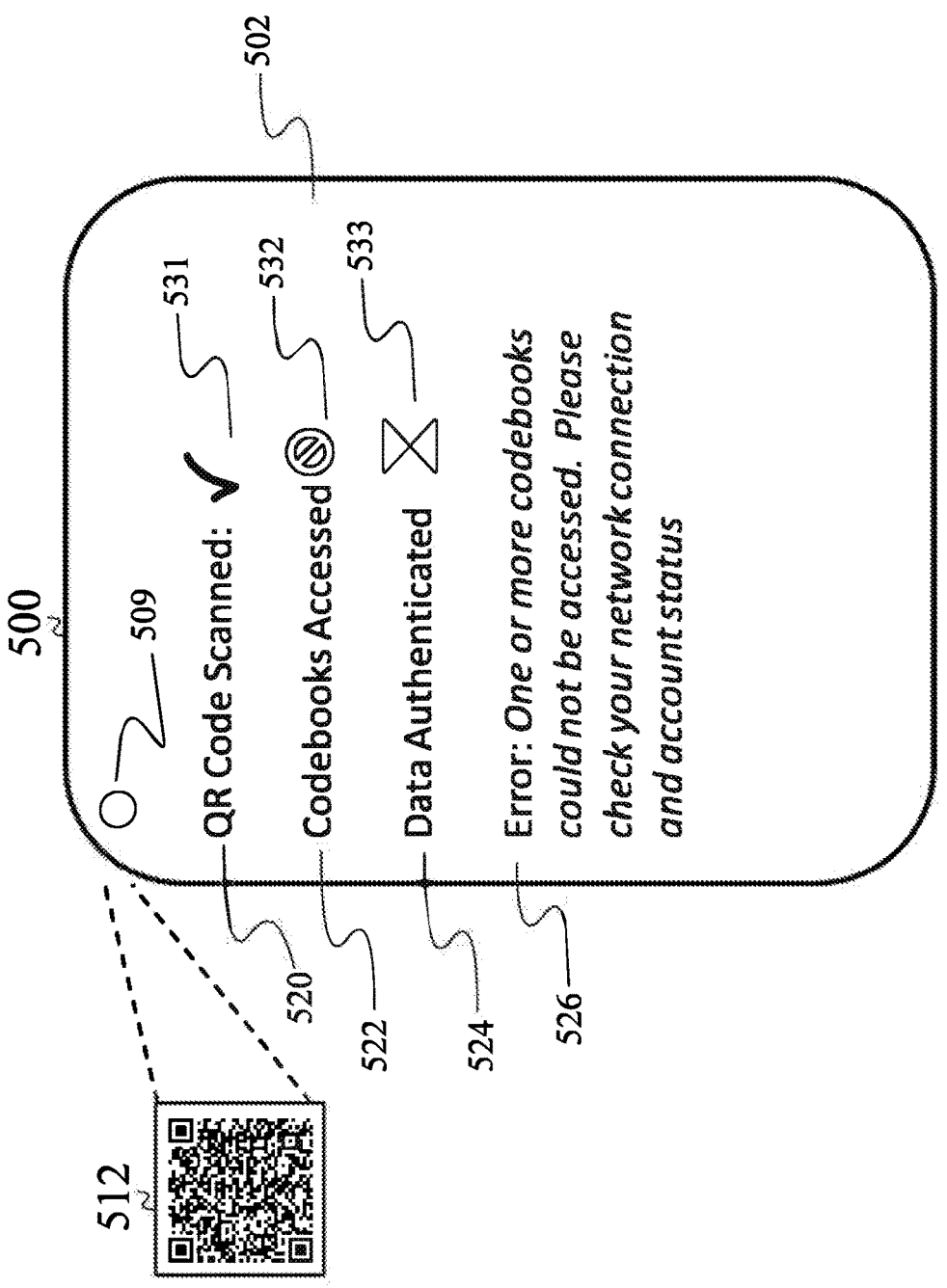
FIG. 5 is a diagram showing an exemplary user interface indicating a failed QR decoding due to an error during codebook access, according to an embodiment.

FIG. 5 is a diagram showing an exemplary user interface indicating a failed QR decoding due to an error during codebook access, according to an embodiment. Electronic device 500 may be a smartphone, tablet computer, laser scanner, or other suitable electronic device for scanning a QR code of disclosed embodiments. The electronic device includes an electronic display 502. The electronic device 500 further includes a camera 509, which is used to obtain an image of a QR code 512 in a digital format, which is loaded into a memory of the electronic device 500 for further processing. In the embodiment shown in FIG. 5, various steps of the QR decoding process are shown, along with a corresponding status indicator. At field 520, there is an indication of a successful scanning (image acquisition), and a corresponding success indicator 531. At field 522, there is an indication of a failed codebook access (failure to retrieve public codebook(s) and/or private codebook(s)), and a corresponding failure indicator 532. Failure causes can include network connectivity failures, and/or authentication/credential failures. At field 524, there is an indication of an uncompleted data authentication (i.e., since the codebook(s) could not be retrieved, and a corresponding incomplete indicator 533. At 526, a corresponding error message is rendered, indicating that one or more codebooks could not be accessed (e.g., based on codebook URLs, such as shown in FIGS. 3 at 306 and 312).

Figure 6:
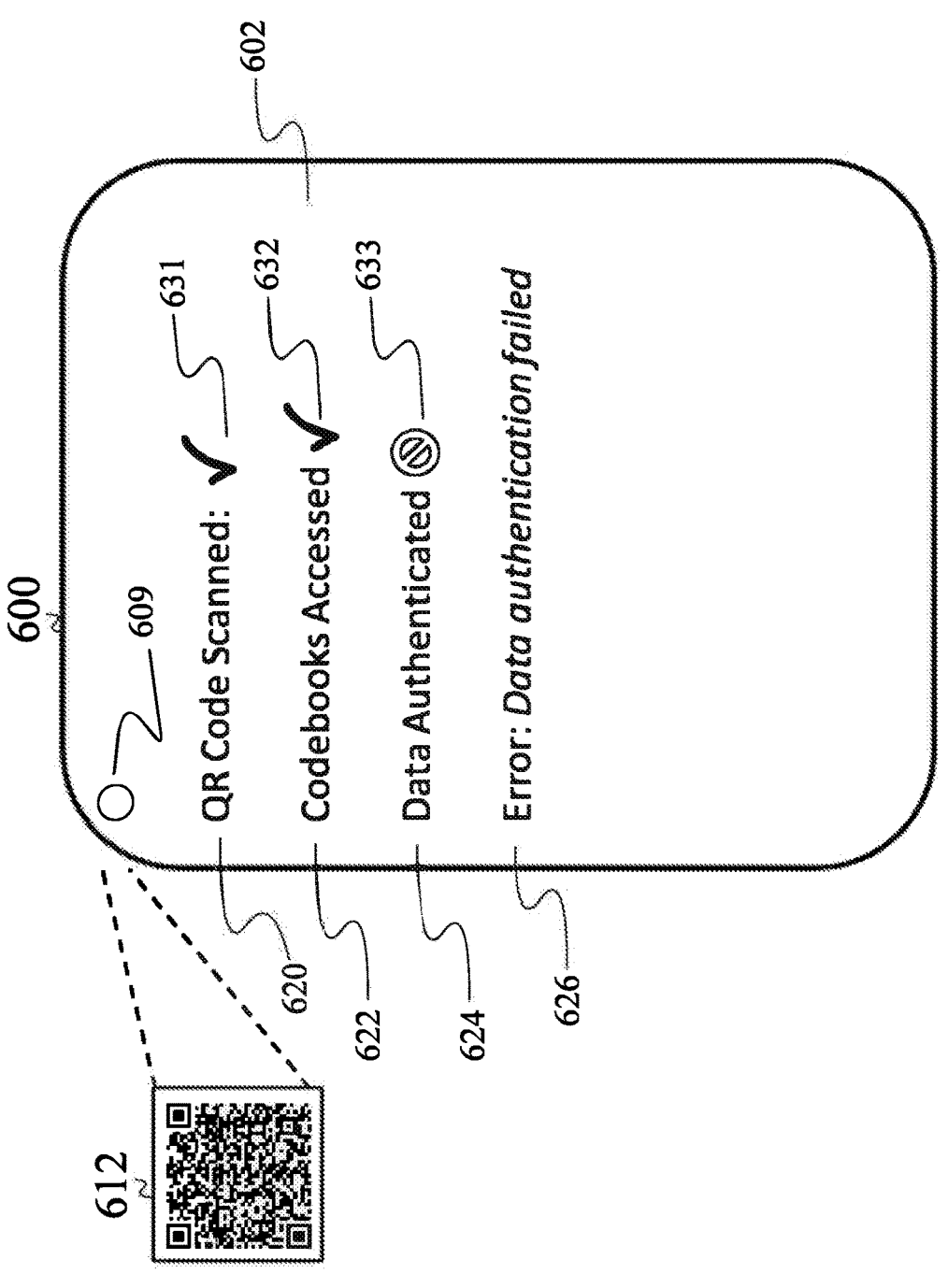
FIG. 6 is a diagram showing an exemplary user interface indicating a failed QR decoding due to an error during data authentication, according to an embodiment.

FIG. 6 is a diagram showing an exemplary user interface indicating a failed QR decoding due to an error during data authentication, according to an embodiment. Electronic device 600 may be a smartphone, tablet computer, laser scanner, or other suitable electronic device for scanning a QR code of disclosed embodiments. The electronic device includes an electronic display 602. The electronic device 600 further includes a camera 609, which is used to obtain an image of a QR code 612 in a digital format, which is loaded into a memory of the electronic device 600 for further processing. In the embodiment shown in FIG. 6, various steps of the QR decoding process are shown, along with a corresponding status indicator. At field 620, there is an indication of a successful scanning (image acquisition), and a corresponding success indicator 631. At field 622, there is an indication of a successful codebook access (successful retrieval of public codebook(s) and/or private codebook(s)), and a corresponding success indicator 632. At field 624, there is an indication of a data authentication failure (e.g., failure to match a computed hash and a received hash), and a corresponding failure indicator 633. Failure causes can include accessing an incorrect codebook, a communication error, and/or other types of errors. At 626, a corresponding error message is rendered, indicating that data authentication has failed (e.g., based on computed and received hashes not matching). In one or more embodiments, the decoded data may also be rendered, such as shown at 426 in FIG. 4. In this way, the user may be able to observe the decoded data, while also being alerted that the data authentication did not succeed. This feature can be useful for diagnosing and troubleshooting of system issues.

Figure 7:
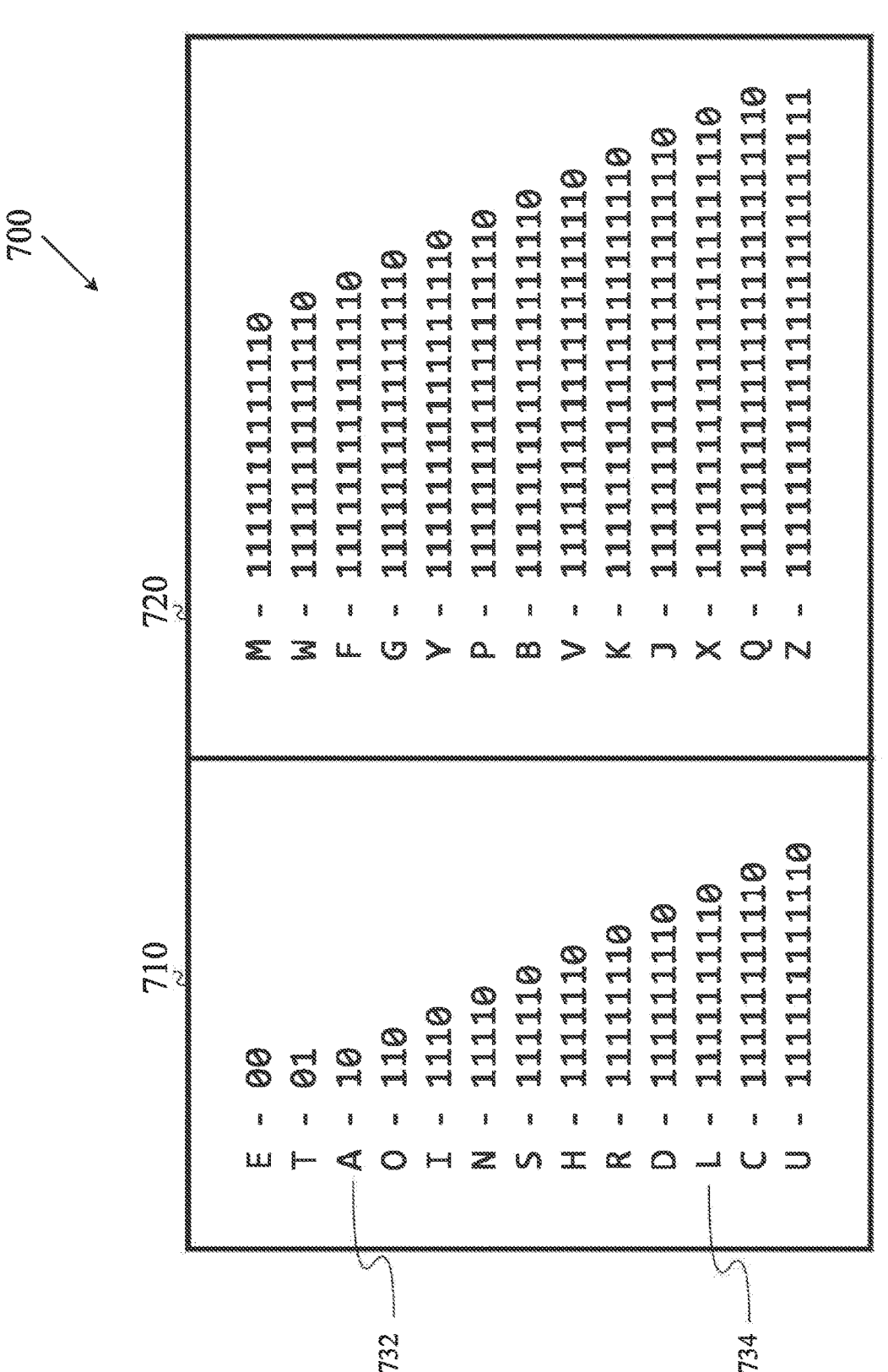
FIG. 7 is an exemplary codebook according to one or more embodiments.

FIG. 7 is an exemplary codebook 700 according to one or more embodiments. As can be seen, the codebook includes a mapping of binary strings to symbols. As an example, at 732, the symbol "A" is mapped to a binary string "10", and at 734, the symbol 734 is mapped to a binary string "1111111110." In embodiments, the codebook mapping is based on an estimated frequency of occurrence of a given symbol, with more frequently occurring symbols mapped to shorter codes, thereby achieving a level of compression. In the example of FIG. 7, column 710 includes symbols that appear more frequently in the English language, while column 720 includes symbols that appear less frequently in the English language. Accordingly, column 720 has larger binary strings than column 710, thereby enabling data compression. While the codebook depicted in FIG. 7 shows capital Roman letters, embodiments can include codebooks with more, fewer, and/or different symbols. In embodiments, the codebooks may be customized for other languages besides English, and/or customized for other types of data patterns. In one or more embodiments, the codebooks may be developed based on machine learning techniques.

Figure 10:
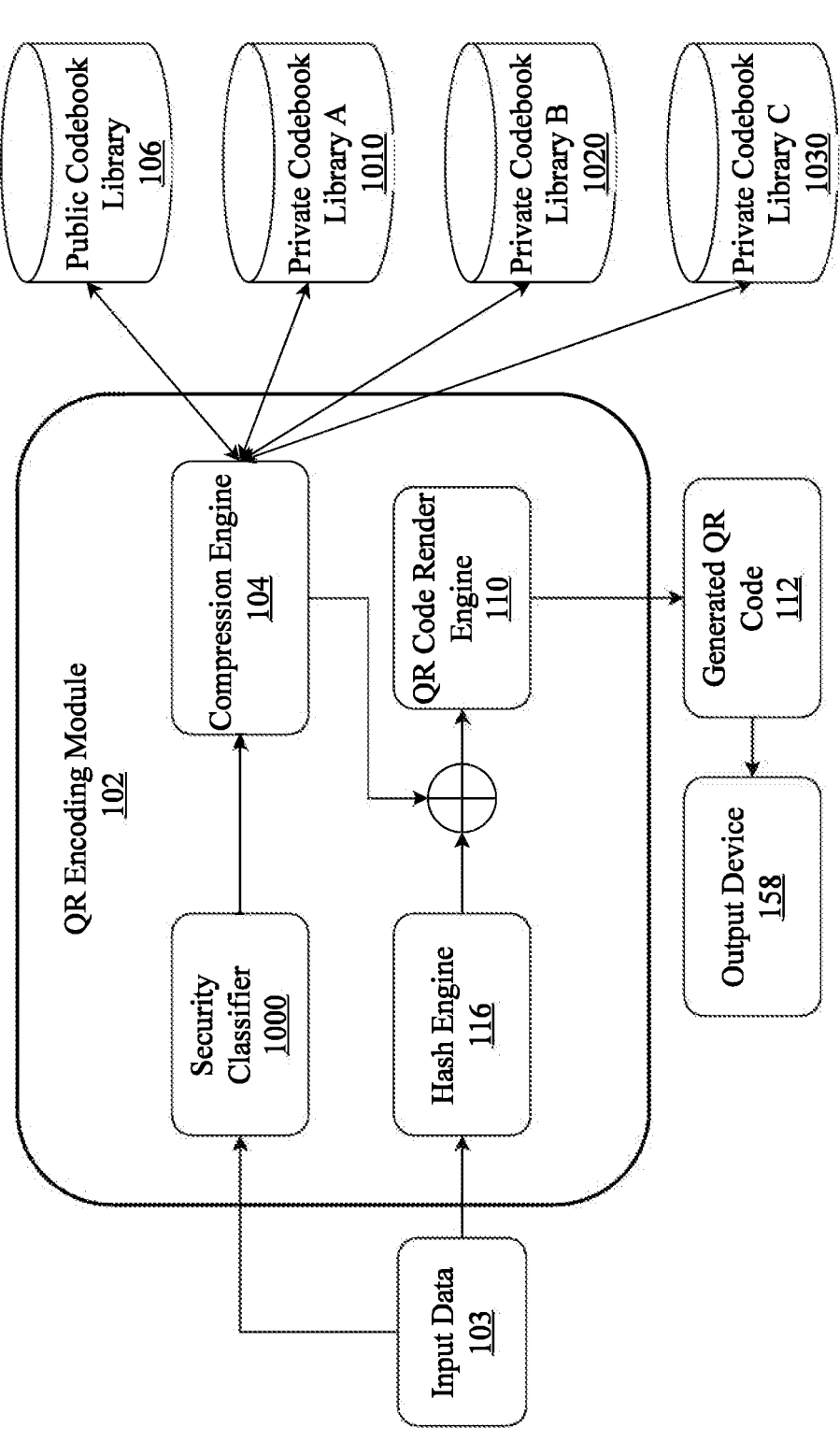
FIG. 10 is a block diagram illustrating an exemplary system architecture for encoding and compressing multi-level security, high-capacity QR codes.

FIG. 10 is a block diagram illustrating an exemplary system architecture for encoding and compressing multilevel security, high-capacity QR codes. The system includes a QR encoding module 102 that incorporates a security classifier 1000 for analyzing and categorizing input data 103 according to configurable security levels. Security classifier 1000 employs multiple classification techniques, including but not limited to pattern matching, regular expressions, machine learning algorithms, and rule-based decision trees to automatically determine appropriate security levels for different data elements. For example, in a medical records context, security classifier 1000 may identify patterns such as "###-##-####" as social security numbers requiring the highest security level, patterns like "name: [text]" or "diagnosis: [text]" as requiring intermediate security, and non-personal identifiers such as study numbers or facility codes as suitable for public access.

Security classifier 1000 can be configured with industry-specific rule sets. In financial applications, for instance, it may classify credit card numbers, bank account details, and transaction amounts as high security data, customer contact information as intermediate security data, and generic product categories as public data. The classified data is then processed by the compression engine 104, which interfaces with multiple codebook libraries, each implementing distinct security and compression protocols. A public codebook library 106 contains standard compression mappings optimized for common data patterns, similar to traditional compression algorithms like Huffman coding. For example, frequently occurring terms in public data might be assigned shorter bit sequences, such as status indicators being mapped to compact binary representations.

Private codebook libraries 1010, 1020, and 1030 implement progressively more sophisticated encryption and compression schemes. Private codebook library A 1010 may employ basic encryption suitable for low security data, using techniques such as simple substitution ciphers combined with compression. Private codebook library B 1020 may implement intermediate encryption using symmetric key algorithms with larger key sizes. Private codebook library C 1030 may utilize advanced encryption standards with maximum key lengths, possibly combined with additional security measures such as initialization vectors and salt values.

In one embodiment, private codebook libraries 1010, 1020, and 1030 represent different security classification levels. For example, private codebook library 1010 may be used for organizational internal data marked as "Internal Use Only," private codebook library 1020 may be used for data marked as "Confidential," and private codebook library 1030 may be used for data marked as "Strictly Confidential." In another embodiment, the security levels may correspond to regulatory compliance requirements, such as private codebook library 1010 for HIPAA compliance, private codebook library 1020 for PCI DSS compliance, and private codebook library 1030 for classified government data. The system supports any number of private codebook libraries to accommodate various security classification schemes and organizational needs.

A hash engine 116 generates cryptographic verification codes for each security level using algorithms such as SHA-256 or SHA-3. For multi-level verification, it computes nested hashes where higher security access requires successful verification of all lower-level hashes, while low security access only requires public data hash verification. Hash engine 116 generates verification codes by concatenating data from appropriate security levels and applying cryptographic hash functions, enabling recipients to verify data integrity at their authorized access level.

A QR code render engine 110 combines the compressed and encrypted data from all security levels into a unified QR code 112. The render engine creates a structured data format that may begin with a header section containing security level markers, followed by codebook identifiers containing references to required codebooks, then the public data section, followed by encrypted sections for each security level, and finally the hash sections for data verification. The engine also implements error correction coding appropriate for the security level, with higher security data receiving stronger error correction capabilities.

The generated QR code 112 is then sent to an output device 158, which may include but is not limited to electronic displays, printers, or digital storage systems. The output device selection may be security-level aware, with certain security levels restricted to specific types of output devices, such as limiting high security data output to secure printers with encryption capabilities.

This enhanced architecture supports dynamic security policies through configurable classifiers and codebooks. Organizations can implement custom security hierarchies by defining security level criteria through classifier rules, creating specialized codebooks for industry-specific data patterns, implementing custom encryption schemes within private codebooks, configuring verification requirements for each security level, and establishing access control policies for different user roles. The system is designed to scale horizontally with additional private codebook libraries as needed, allowing organizations to implement arbitrary numbers of security levels while maintaining backward compatibility with existing QR code readers for public data access.

Figure 11:
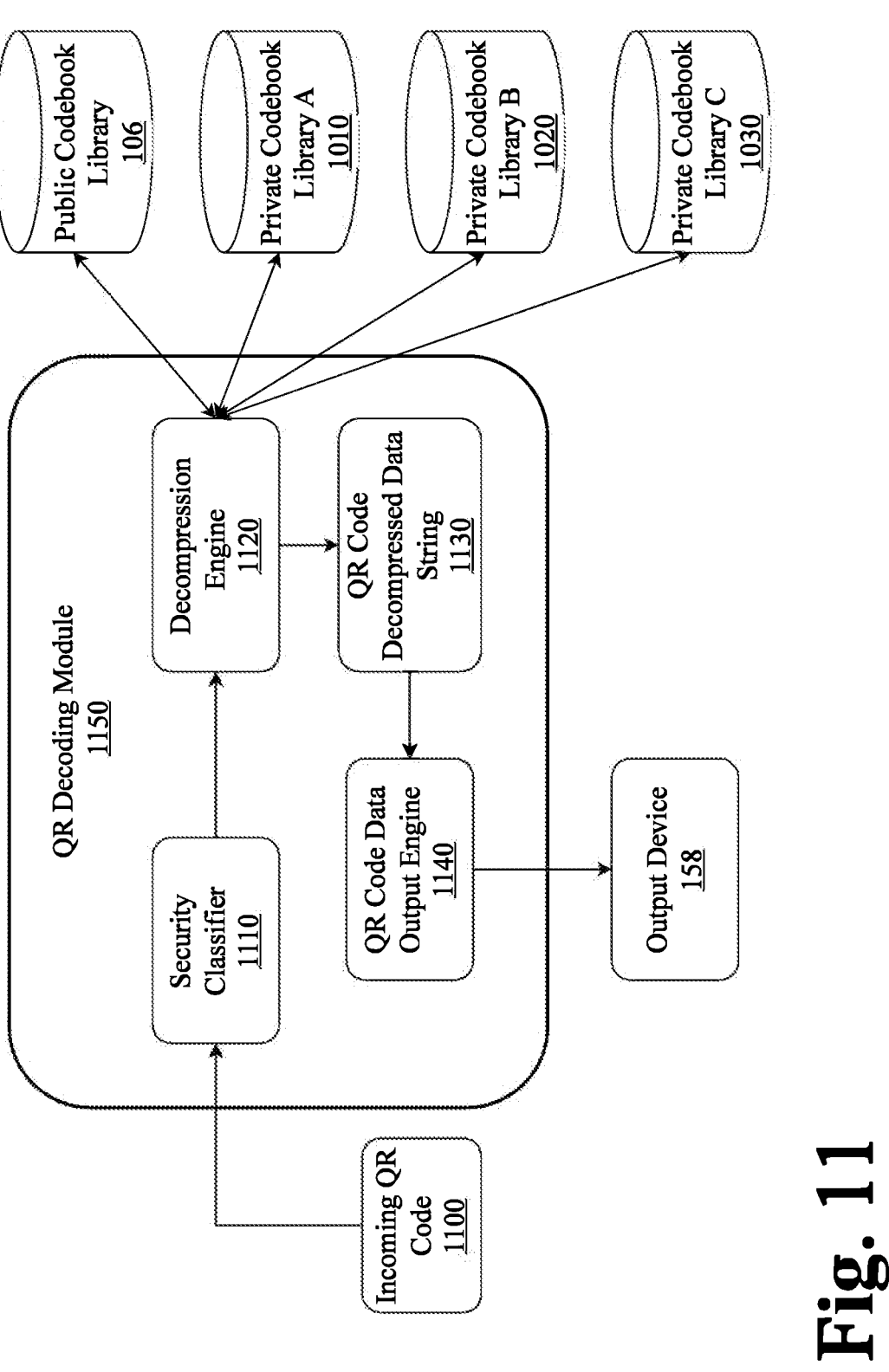
FIG. 11 is a block diagram illustrating an exemplary system architecture for decoding multi-level security, high-capacity QR codes.

FIG. 11 is a block diagram illustrating an exemplary system architecture for decoding multi-level security, high-capacity QR codes. The system begins with an incoming QR code 1100 that contains multiple layers of secured data encoded according to various security classifications. Upon receipt, a QR decoding module 1150 processes this incoming code through a security classifier 1110 that examines the QR code's structure to identify the security levels present within the encoded data.

Security classifier 1110 in the decoding module analyzes the security markers and metadata embedded within the QR code to determine which codebook libraries are required for decompression. The classifier examines user credentials and access rights to determine which security levels can be accessed by the current user. For example, in a healthcare setting, a nurse might have access to basic patient information but not complete medical history, while a treating physician would have full access to all security levels.

A decompression engine 1120 interfaces with both public and private codebook libraries to decode the data according to the user's authorization level. Public codebook library

106 is used to decompress publicly accessible data that requires no special authorization. In one embodiment, the system may include any number of private codebook libraries (1010, 1020, 1030) corresponding to different security classifications. For instance, private codebook library 1010 might be used for decompressing "Internal Use Only" data, while private codebook library 1030 might be required for "Strictly Confidential" information. The system supports an arbitrary number of private codebooks to accommodate various organizational security schemes.

Decompression engine 1120 processes each security level sequentially, beginning with public data and progressing through higher security levels as authorized. For each security level, the engine verifies the corresponding hash values before proceeding with decompression. If a hash verification fails, or if the user lacks authorization for a particular security level, the decompression engine will only process data up to the highest authorized and verified level.

The decompressed data is assembled into a QR code decompressed data string 1130 that maintains the security level segregation of the original data. This segregation ensures that even after decompression, data from different security levels remains logically separated and can be handled according to appropriate security protocols. QR code data output engine 1140 then processes this decompressed data string, formatting it appropriately for the output device 158 while maintaining any required security restrictions.

Output device 158 may include various types of displays or storage systems, each potentially having different security capabilities. The system may restrict certain security levels to specific types of output devices based on their security features. For example, high-security data might only be displayed on devices with automatic screen locking or secure printing capabilities. QR code data output engine 1140 enforces these restrictions by controlling how and where the decompressed data can be presented or stored.

The overall decoding architecture provides a flexible framework for handling multi-level secure QR codes while maintaining strict access controls. By supporting an arbitrary number of security levels through multiple private codebook libraries, the system can accommodate complex organizational security requirements while ensuring that users can only access data for which they have proper authorization. The architecture's modular design allows for easy addition of new security levels and codebook libraries as organizational needs evolve, while maintaining compatibility with existing QR code standards for public data.

FIG. 8 is a flow diagram illustrating an exemplary method for encoding information into a QR code, according to an embodiment. According to the embodiment, the method 800 begins at step 802 where input data to be encoded is obtained. The data can include text data. The method 800 continues to step 804, separating the input data into a public data portion and a private data portion. In embodiments, the determination of what data is separated into a public data portion and a private data portion may be based on user-defined settings. As an example, certain data fields within the input data may be compressed using a public codebook, while other data fields within the input data may be compressed using a private codebook. For example, in a medical records application, some data may be compressed with the public codebook to enable statistical processing and data aggregation, such as an age of a person, and the state the person resides in, while other data. such as name, address, and/or other personally identifiable data is encrypted using a private codebook. Thus, disclosed embodiments can enable anonymization of some data, while exposing other data. This can enable useful collection of statistics for a wide variety of applications, such as public health, traffic studies, consumer behavior, and so on, while maintaining privacy of individuals. A user that only has access to the public data can use a QR code reading device that has access to the public codebook, but does not have access to the private codebook, enabling access to the public data, while preventing access to the private data. Similarly, a user that only access to both the public data and the private data can use a QR code reading device that has access to both the public codebook and the private codebook, enabling access to the public data, as well as the private data.

The method 800 continues to step 806, where a hash of the public data portion and private data portion are computed. The method 800 continues to step 808, where the public data portion is compressed using a public codebook. The method 800 continues to step 810, where the private data portion is compressed using a private codebook. The method 800 continues to step 812, where the public compressed data portion, private compressed data portion, and hash, are included in a combined data string, such as depicted at 302 in FIG. 3.

FIG. 9 is a flow diagram illustrating an exemplary method for decoding a QR code, according to an embodiment. According to the embodiment, the method 900 begins at step 902 where a QR code image is obtained. In embodiments, the image may be obtained via an onboard camera of an electronic device, such as a smartphone, tablet computer, and/or dedicated QR code reading device. The method 900 continues to step 904, where the obtained QR code image is decoded into an input string (e.g., such as depicted at 302 in FIG. 3). The method 900 continues to step 906, where a compressed public data portion and a compressed private data portion of the input string are identified. In one or more embodiments, the identification of compressed public data portion(s) and compressed private data portion(s) can include parsing the input string to identify the location of corresponding markers (e.g., such as 304, 310, and/or 316 of FIG. 3). The method 900 continues to step 908, where the compressed public data is decoded using a public codebook. In one or more embodiments, the decompression process can include using a public codebook Uniform Resource Locator (URL) (306 of FIG. 3) to access a public codebook (e.g. 106 of FIG. 3).

The method 900 continues to step 910, where the compressed private data is decoded using a private codebook. In one or more embodiments, the decompression process can include using a private codebook Uniform Resource Locator (URL) (312 of FIG. 3) to access a private codebook (e.g. 108 of FIG. 3). The method 900 continues to step 912, where the decoded public data portion and decoded private data portion are combined into a combined uncompressed data string. The combined uncompressed data string can then be sent to one or more output device(s), such as an electronic display, printer, and/or other suitable output device.

In one or more embodiments, the codebooks may be stored in memory of an electronic device that is decoding a QR code. Thus, embodiments can include identifying a public codebook Uniform Resource Locator (URL) within the input string; storing the public codebook in the memory; identifying a public codebook Uniform Resource Locator (URL) within the input string; and storing the private codebook in the memory. In some embodiments, the codebooks may be stored in memory until a resident QR code reading application is closed. In this way, performance can be increased by not needing to retrieve a codebook that is already stored in memory, enabling faster reading of QR codes. In one or more embodiments, the codebooks may be cleared from memory (and contents overwritten with a data pattern) immediately after decoding a QR code. By clearing the codebooks from memory after each QR decode, security is improved, although there is a performance tradeoff. In one or more embodiments, a user setting can enable a user to select an option to cache the codebooks while using the QR code reading application, or to clear the codebooks after every QR decode. In one or more embodiments, the codebook clearing can be based on a network health status of the electronic device that is decoding a QR code. In embodiments, with a robust network status (e.g., high signal strength, and high bandwidth), the codebooks are cleared after each QR decode. Conversely, during conditions of a non-robust network status (e.g., low signal strength, and/or low bandwidth), the codebooks are preserved until a resident QR code reading application is closed or the network status improves. In this way, disclosed embodiments can provide a feature that provides both performance and security in decoding QR codes that provide increased data capacity. Thus, embodiments can include determining a network connectivity status of the system; and in response to determining a robust network connectivity status, clearing the private codebook from the memory after setting the status of the uncompressed data string to authenticated. Additionally, embodiments can include, in response to determining a non-robust network connectivity status, clearing the private codebook from the memory after a QR decoding application executing on the processor terminates.

FIG. 12 is a flow diagram illustrating an exemplary method for encoding and compressing multi-level security, high-capacity QR codes. In a first step 1200, input data is obtained for encoding into a QR code. This input data may comprise various types of information, such as medical records, financial data, or personnel information, which requires different levels of security protection.

In a step 1210, the input data is analyzed to determine appropriate security classifications for different portions of the data. The analysis employs pattern recognition, rule-based algorithms, and predefined security policies to categorize data elements. For example, when processing medical records, the system might identify patient names and social security numbers as requiring high-security classification, while general demographic information might receive a lower security designation.

In a step 1220, the system operates on the first block in the compressed blockchain with an uncompromised hashing function to generate a block-specific hash value. This hashing operation creates a unique identifier for the data block that will be used for verification during the decoding process. The hash value serves as a cryptographic seal, ensuring the integrity of the encoded data and enabling recipients to verify that the data hasn't been tampered with.

In a step 1230, the system compresses the input data into either public or private compressed data portions using multiple codebooks based on the determined security classifications. The compression process utilizes a public codebook for generally accessible information and various private codebooks for data requiring different levels of security protection. For instance, in a corporate environment, the system might use one private codebook for "Internal Use Only" data, another for "Confidential" information, and additional codebooks for higher security classifications.

In a step 1240, the system combines the public compressed data portion and private compressed data portions into a unified data string. This combination process preserves the security boundaries between different data classifications while creating a single, coherent data structure. The combined string includes necessary metadata such as security level markers, codebook identifiers, and hash values for each security level.

In a step 1250, the system generates a QR code from the combined data string. This final step creates a machine-readable optical code that encapsulates all the security levels and compressed data in a format suitable for printing or digital display. The resulting QR code maintains the security and integrity of the original data while enabling efficient storage and transmission of the information.

Figure 13:
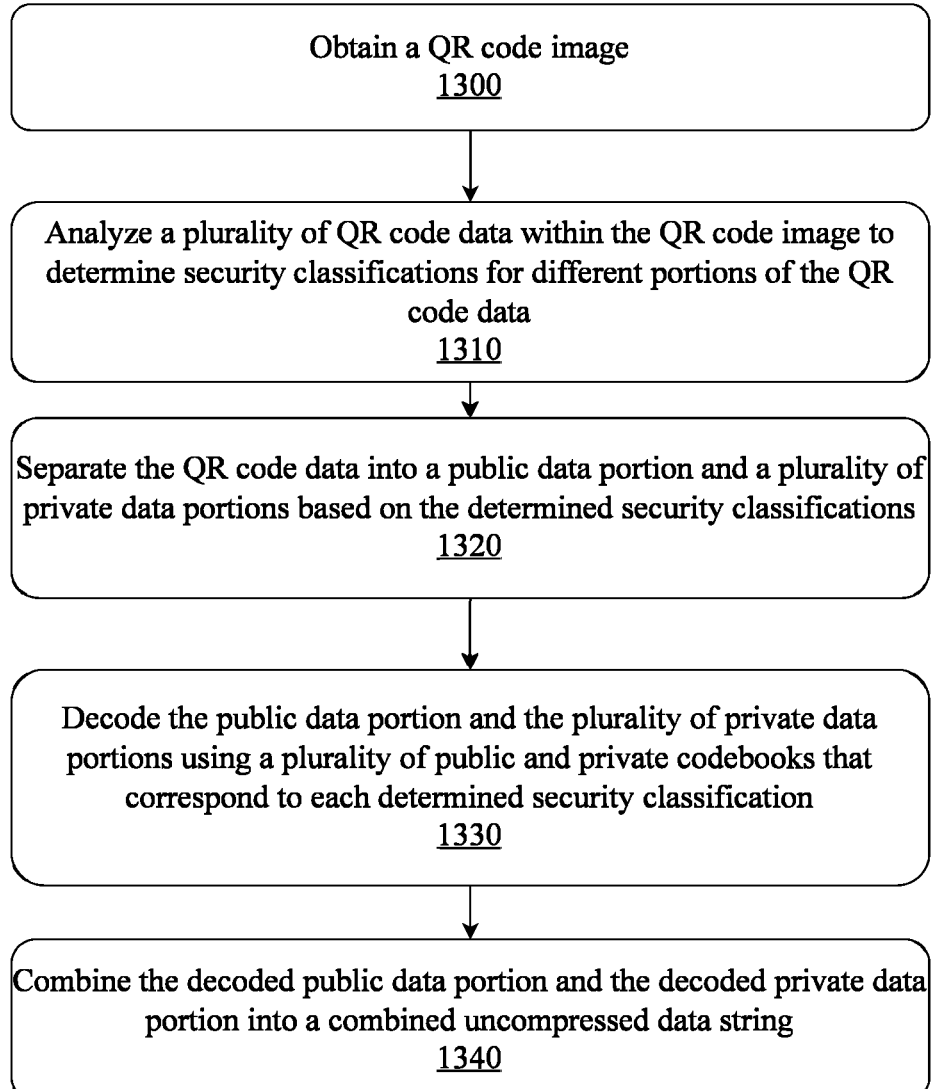
FIG. 13 is a flow diagram illustrating an exemplary method for decoding multi-level security, high-capacity QR codes.

FIG. 13 is a flow diagram illustrating an exemplary method for decoding multi-level security, high-capacity QR codes. In a first step 1300, a QR code image is obtained through various means such as a camera device, scanner, or digital file. The QR code image contains encoded data with multiple security classifications that require different levels of access authorization.

In a step 1310, the system analyzes the QR code data to determine security classifications for different portions of the encoded information. This analysis examines embedded security markers, metadata, and structural indicators within the QR code to identify the security levels present. The system evaluates user credentials against these security classifications to determine which portions of the data the current user is authorized to access.

In a step 1320, the system separates the QR code data into a public data portion and multiple private data portions based on the identified security classifications. This separation ensures that data remains properly segregated according to its security requirements. For example, in a healthcare setting, the system might separate public demographic data from private medical history data, and further separate highly confidential genetic information into a separate security tier.

In a step 1330, the system decodes both the public data portion and the various private data portions using corresponding codebooks. The public data portion is decoded using a standard public codebook, while each private data portion is decoded using its corresponding private codebook based on its security classification. The decoding process includes verification of hash values for each security level to ensure data integrity and authenticity.

In a step 1340, the system combines the decoded public data portion and the authorized decoded private data portions into a unified uncompressed data string. This combination process maintains logical separation between different security levels while presenting the data in a cohesive format. The resulting data string contains only the information that the user is authorized to access, with higher security levels remaining encrypted if the user lacks proper authorization.

Dynamic Security Level for Multi-Level Security in High-Capacity Optical Codes System Architecture FIG. 14 is a block diagram illustrating exemplary architecture of dynamic security level system 1400, in an embodiment. Dynamic security level system 1400 extends the functionality of the multi-level security optical code systems described in previous figures by adding context-aware security capabilities.

Context analysis engine 1410 functions as the central analytical component for evaluating contextual factors that influence security decisions. In an embodiment, context analysis engine 1410 may implement a multi-stage processing pipeline that includes data ingestion, normalization, analysis, and decision-making stages. For example, the normalization stage may convert diverse data formats such as GPS coordinates (e.g., degrees/minutes/seconds or decimal degrees), network signal strength indicators (e.g., dBm values or arbitrary units), and device security states (e.g., binary flags or multi-level ratings) into a standardized representation suitable for unified analysis. Context analysis engine 1410 may, in some embodiments, employ a rules-based evaluation system that applies conditional logic to normalized contextual parameters, for instance, determining that a financial transaction QR code may only be accessed when the device is connected to a known secure network AND is physically located within a trusted facility. The engine may incorporate weighted scoring algorithms that can assign different importance values to various contextual factors—for example, assigning higher weight to biometric authentication status than to time of day when determining access to medical records. Context analysis engine 1410 may establish secure communication channels with hash engine 116 to verify that context assessment data has not been manipulated or compromised during processing. In some embodiments, context analysis engine 1410 may maintain a temporal database of historical context information that can be used to establish baseline patterns of legitimate access and identify potential security anomalies, such as unusual access attempts from new locations or at atypical times.

Context analysis engine 1410 may incorporate various machine learning models to enhance contextual security decisions. In one embodiment, the engine may employ supervised learning models such as random forests or gradient-boosted decision trees trained on labeled datasets of legitimate and suspicious access patterns. These models could be trained using historical access logs where security experts have identified normal and anomalous behaviors. For example, a model might be trained on data that includes location coordinates, time stamps, network environment characteristics, and corresponding labels indicating whether each access attempt was legitimate or suspicious. In another embodiment, context analysis engine 1410 may utilize unsupervised learning techniques such as clustering algorithms or anomaly detection models to identify unusual patterns without requiring pre-labeled data. These models might analyze multidimensional contextual data to establish normal behavior baselines and flag deviations that fall outside expected parameters. Additionally, context analysis engine 1410 may incorporate reinforcement learning models that can adapt security policies based on feedback about successful and unsuccessful access attempts, allowing the system to improve its contextual security decisions over time. The training data for these models may include anonymized telemetry from actual usage patterns, simulated security scenarios, or synthetic data generated to represent edge cases rarely encountered in practice.

Contextual data collection subsystem 1420 operates as a distributed sensor framework that gathers environmental information relevant to security decisions. In an embodiment, contextual data collection subsystem 1420 may implement hardware abstraction layers that enable consistent access to sensor data across diverse device types and operating systems. For example, on a mobile device, the subsystem may interface with GPS receivers to obtain precise location coordinates, while on desktop systems it might rely on IP geolocation or Wi-Fi positioning instead. The network parameter collection capabilities may include, in some embodiments, detailed assessment of connection security attributes such as detecting whether a Wi-Fi network employs WPA3 encryption, whether TLS 1.3 is being used for HTTPS connections, or whether a corporate VPN tunnel is active. Device security state extraction may involve, for example, checking whether the device has been jailbroken or rooted, verifying the recency of operating system security patches, confirming that disk encryption is enabled, and validating that a secure boot chain was established during system startup. The behavioral monitoring component may track user interaction patterns such as typing rhythm, swipe gestures, or app usage sequences to establish a behavioral baseline that can be used to detect potential unauthorized use. In certain embodiments, contextual data collection subsystem 1420 may implement differentiated privacy techniques that add calibrated noise to sensitive contextual data to protect user privacy while still allowing meaningful security assessments. The adaptive polling mechanisms may intelligently adjust data collection frequency based on factors such as battery level, motion sensor input indicating device movement, or detection of significant environmental changes that might warrant reevaluation of security context.

Security policy management subsystem 1430 provides infrastructure for defining and enforcing context-based security rules. In an embodiment, security policy management subsystem 1430 may implement a domain-specific policy language that allows security administrators to express complex contextual security requirements in a human-readable format while enabling efficient machine processing. For example, a policy might specify that "Level 3 security data may only be accessed if the device is connected to the corporate network AND is located within building coordinates (lat/long boundaries) AND the time is between 8:00 AM and 6:00 PM local time AND the user has completed two-factor authentication within the last 30 minutes." The hierarchical policy structure may, in some implementations, allow organization-wide baseline policies to be defined at the root level, with department-specific or role-based policies inheriting and extending these baseline requirements at lower levels in the hierarchy. Policy templates may include, for example, pre-configured settings appropriate for different scenarios such as "Secure Facility" (requiring strong location verification), "Remote Worker" (emphasizing network security and device integrity), or "Field Operations" (prioritizing offline capabilities with strong device authentication). In certain embodiments, security policy management subsystem 1430 may provide a graphical policy builder interface that allows administrators to construct complex policies through visual components rather than requiring manual coding of policy rules. The conflict resolution mechanisms may implement sophisticated algorithms that can detect logical contradictions between policies at different hierarchy levels and either automatically resolve them based on predefined precedence rules or flag them for administrator attention.

Context-adaptive decoding controller 1440 serves as the enforcement mechanism that implements security decisions based on contextual analysis. In an embodiment, context-adaptive decoding controller 1440 may function as a security proxy that intercepts all data flows between QR decoding subsystem 202 and decompression engine 204, applying fine-grained access controls based on current contextual assessments. For example, when a multi-level QR code is scanned in a public location on an unknown network, the controller might only permit decompression of the public data portions while blocking access to private security levels, even if the user possesses the necessary private codebooks. The secure communications channels may implement, in some embodiments, end-to-end encrypted protocols using ephemeral session keys to protect data in transit between system components, preventing man-in-the-middle attacks that might attempt to bypass security controls. The access control mechanisms may be implemented as a multidimensional matrix that maps various combinations of user credentials, device states, location parameters, network characteristics, and temporal factors to specific permissions for each security level in the QR code. For instance, a particular combination might allow full access to security levels 1 and 2, read-only access to level 3, and no access to level 4. In certain implementations, context-adaptive decoding controller 1440 may provide graceful degradation of functionality when contextual confidence is uncertain—for example, if location verification is inconclusive but other security factors are strong, the system might allow access to lower-security data while requiring additional verification before exposing highly sensitive information. The audit logging capabilities may record comprehensive metadata about each access decision, including the specific contextual factors that were evaluated, their values at the time of access, the security policies that were applied, and the resulting access control decisions.

Contextual authentication verification subsystem 1450 ensures integrity of contextual data through multiple validation mechanisms. In an embodiment, contextual authentication verification subsystem 1450 may employ asymmetric cryptography to digitally sign contextual data at its source, creating a verifiable chain of custody for security-critical information such as location coordinates or network environment characteristics. For example, when GPS location data is collected, it might be immediately signed using a device-specific private key before being transmitted to other system components, allowing recipients to verify both the origin and integrity of the data. Cross-validation techniques may include, in some implementations, triangulating location using multiple independent sources such as GPS, cellular tower positioning, and nearby Wi-Fi networks to achieve higher confidence in location claims. The tamper-evident storage may utilize techniques such as Merkle trees or blockchain-inspired data structures to create cryptographically linked records of contextual data that make retrospective manipulation detectable. In certain embodiments, challenge-response mechanisms for location verification might involve dynamic challenges based on environmental characteristics—for instance, requiring the device to report identifiers of nearby Bluetooth beacons or Wi-Fi networks that should be present at the claimed location. The continuous authentication component may implement statistical analysis of contextual stability, detecting anomalies such as impossibly rapid changes in location or unusual transitions between network environments that might indicate replay attacks or context spoofing attempts. For high-security applications, contextual authentication verification subsystem 1450 may leverage hardware security features such as GPS anti-spoofing technology, secure enclaves for cryptographic operations, or trusted platform modules (TPMs) to establish a hardware root of trust for contextual measurements.

Dynamic security level system 1400 transforms the data flow of the multi-level security framework by incorporating contextual awareness throughout the encoding and decoding processes. In the encoding pathway, input data 103 first passes through security classifier 1000, which has been enhanced to perform dual classification functions. Security classifier 1000, in addition to categorizing data into appropriate security levels as described previously, now also analyzes each data segment to determine its context sensitivity requirements. For example, in an embodiment, security classifier 1000 may identify that certain financial data should only be accessible when the scanning device is connected to a corporate network, while patient identifiers might require presence within a healthcare facility. This enhanced classification may utilize pattern recognition, metadata analysis, or predefined tagging to associate appropriate contextual requirements with different data types.

Once security classifier 1000 completes its enhanced classification, the security level information and context sensitivity requirements flow to compression engine 104, which utilizes the appropriate codebooks from public codebook library 106 and private codebook libraries 108, 1010, 1020, and 1030 to compress the data while preserving the security classifications. Simultaneously, context analysis engine 1410 processes the context sensitivity requirements determined by security classifier 1000, creating structured context policy rules that can be efficiently encoded alongside the compressed data. QR code render engine 110 then incorporates both the compressed data and the context policy rules into the generated QR code 112, embedding the contextual security requirements in a format that can be interpreted during subsequent decoding operations.

During the decoding pathway, when QR code 212 is scanned, two parallel processes are initiated. QR decoding subsystem 202 begins extracting the encoded data and identifying embedded context policy rules, while contextual data collection subsystem 1420 simultaneously gathers real-time environmental information from the scanning device and its surroundings. The extracted context policy rules and gathered contextual data converge at context analysis engine 1410, which evaluates whether the current contextual conditions satisfy the requirements specified during encoding. Based on this evaluation, context-adaptive decoding controller 1440 dynamically determines which security levels can be accessed under the present circumstances, regardless of whether the user possesses the necessary codebooks for all security levels. Context-adaptive decoding controller 1440 then instructs decompression engine 204 regarding which portions of the data to decode, and decompression engine 204 selectively retrieves the appropriate codebooks from libraries 106, 108, 1010, 1020, and 1030 to decompress only the authorized security levels. Throughout this process, hash engine 116 performs expanded verification functions, not only confirming the integrity of the compressed and decompressed data but also validating that the context-based access decisions have not been compromised or manipulated. This integrated architecture enables QR codes to adapt their security behavior dynamically based on environmental factors while maintaining full compatibility with the multi-level security framework.

In an embodiment, the operation and data flow through dynamic security level system 1400 begins when input data 103 enters the system for encoding into a context-aware optical code. The data first passes through security classifier 1000, which analyzes content patterns and sensitivity to categorize information into appropriate security levels while simultaneously determining contextual access requirements for each segment. These dual classifications flow to compression engine 104, which compresses the data using security-appropriate codebooks, while context analysis engine 1410 formulates structured context policy rules based on the determined requirements. QR code render engine 110 combines the compressed data and context rules into a single optical code 112 with embedded security and contextual markers. When this code is later scanned, QR decoding subsystem 202 processes the encoded information while contextual data collection subsystem 1420 independently gathers environmental data from sensors, network parameters, and device security states. Context analysis engine 1410 evaluates this real-time contextual data against the embedded policy requirements, generating a contextual security assessment. Context-adaptive decoding controller 1440 uses this assessment to determine which security levels should be accessible under current conditions, instructing decompression engine 204 to selectively retrieve and apply only those codebooks necessary for authorized security levels. The partially decoded data passes through contextual authentication verification subsystem 1450, which validates the integrity of both the data and contextual assessments before QR code data output engine 210 delivers the authorized portions to output device 208. Throughout this process, security policy management subsystem 1430 provides the governance framework that defines how contextual factors translate to access permissions, while hash engine 116 ensures cryptographic verification of data integrity at each security level.

Figure 15:
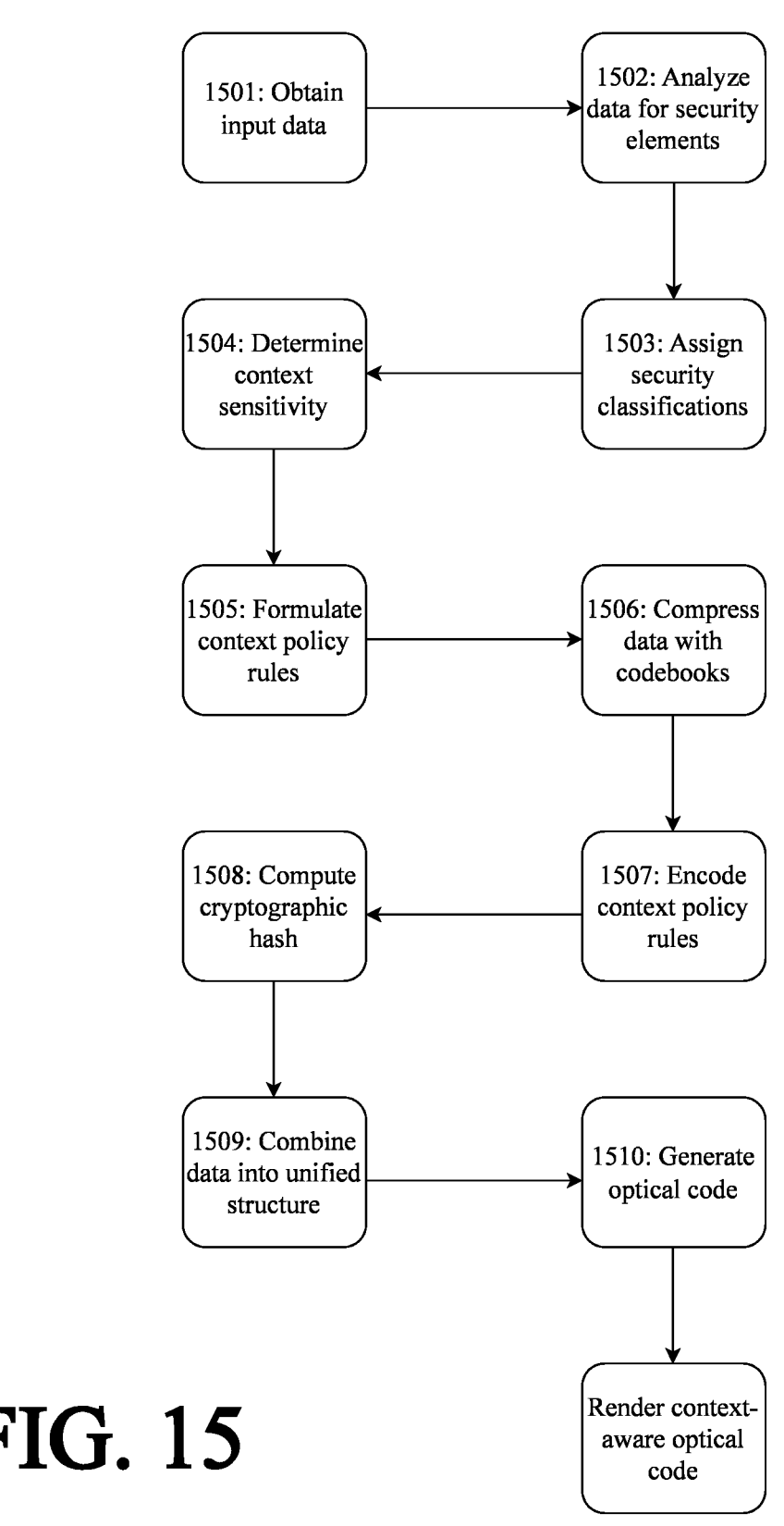
FIG. 15 is a flow diagram illustrating an exemplary method for context-based encoding of optical codes.

FIG. 15 is a flow diagram illustrating an exemplary method for context-based encoding of optical codes. The method begins when input data is obtained for encoding into a context-aware optical code 1501. The input data is analyzed using pattern recognition and content examination techniques to identify elements that require security protections 1502. Security classifications are then assigned to different portions of the data based on sensitivity levels, regulatory requirements, and organizational security policies 1503. For each security classification, context sensitivity requirements are determined by analyzing how environmental factors should influence access to that data category 1504. These requirements might include location constraints, network security conditions, time-based restrictions, and device security prerequisites. A comprehensive context policy rule set is formulated based on the determined context sensitivity requirements, incorporating logical operators and weighted conditions to define precise access criteria 1505. The classified data is compressed using appropriate public and private codebooks selected from codebook libraries based on the assigned security classifications 1506. The context policy rule set is transformed into a compact, machine-readable format suitable for embedding within the optical code structure 1507. A cryptographic hash value is computed based on both the compressed data and encoded context policy rules to enable later verification of data integrity and policy authenticity 1508. The compressed data, encoded context policy rules, and hash value are systematically combined into a unified data structure that preserves the relationships between security levels and their associated contextual requirements 1509. An optical code is generated incorporating this unified data structure, with appropriate error correction coding and formatting 1510. Finally, the resulting context-aware optical code is rendered on an output device such as a display screen or printer 1511.

Figure 16:
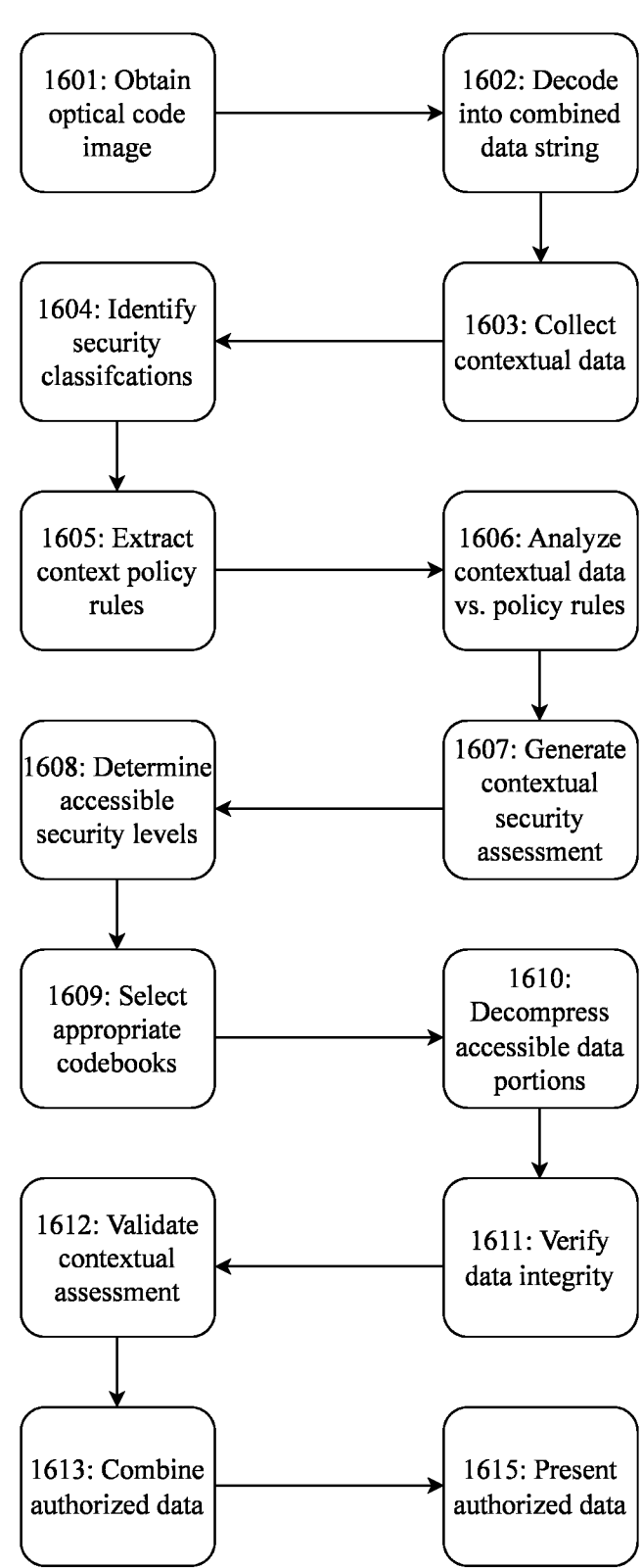
FIG. 16 is a flow diagram illustrating an exemplary method for context-adaptive decoding of optical codes.

FIG. 16 is a flow diagram illustrating an exemplary method for context-adaptive decoding of optical codes. The method begins when an optical code image is obtained from an input device such as a camera or scanner 1601. The optical code is decoded into a combined data string containing compressed data, context policy information, and verification elements 1602. Simultaneously, contextual data is collected from the environment in which the optical code is scanned, gathering information from device sensors, network parameters, security states, and user authentication status 1603. Security classifications are identified within the decoded data string to determine which portions of data belong to which security levels 1604. Context policy rules are extracted from the decoded data string, revealing the specific environmental conditions required for accessing each security level 1605. The collected contextual data is thoroughly analyzed against the extracted context policy rules using logical evaluation and weighted scoring algorithms 1606. A contextual security assessment is generated based on this analysis, quantifying the degree to which current environmental conditions satisfy the requirements for each security level 1607. Security levels accessible under current contextual conditions are determined by matching the contextual security assessment against defined thresholds for each level 1608. Appropriate codebooks are selected from public and private codebook libraries based on the accessible security levels and user credentials 1609. Only the portions of data corresponding to accessible security levels are decompressed using the selected codebooks, maintaining protection of higher-security data when contextual requirements aren't met 1610. The integrity of the selectively decompressed data is verified using cryptographic hash values to ensure the data hasn't been tampered with 1611. The authenticity of the contextual assessment is validated through cryptographic mechanisms to prevent spoofing of contextual factors 1612. Authorized decoded portions from different security levels are combined into a cohesive uncompressed data string according to their original relationships 1613. Finally, the uncompressed data is presented to the user according to their access privileges, displaying only the information they are authorized to view based on both their credentials and the current contextual conditions 1614.

In a non-limiting use case example, dynamic security level system 1400 could be deployed in a pharmaceutical research environment where clinical trial data needs to be securely shared among various stakeholders while ensuring appropriate access controls that adapt to different contexts. A principal investigator at a research hospital creates a comprehensive clinical trial report containing multiple categories of data with varying sensitivity levels. Using a tablet with the encoding components of system 1400 installed, the investigator initiates the encoding process by importing the clinical trial document.

Security classifier 1000 analyzes the document and automatically categorizes different portions: aggregate statistical results are classified as public data; anonymized patient response data as moderately sensitive; and personally identifiable patient information and proprietary drug formulations as highly sensitive. Additionally, security classifier 1000 determines context sensitivity requirements for each category—public data can be accessed anywhere, anonymized patient data should only be accessible within healthcare facilities or when connected to secure research networks, and identifiable patient information should only be accessible within specific research facilities by authenticated medical personnel during business hours.

Context analysis engine 1410 transforms these requirements into structured policy rules, specifying that security level 3 (containing identifiable patient information) requires GPS coordinates within hospital boundaries, connection to the hospital's secure network, biometric authentication of the user, and access during approved research hours. Meanwhile, compression engine 104 compresses each data segment using the appropriate codebooks based on security classification.

The investigator reviews the security classifications and context requirements through a user interface, making minor adjustments to the automatically assigned settings. Upon approval, QR code render engine 110 generates a high-capacity QR code incorporating the compressed multi-level data and context policy rules. This QR code is then printed on physical research documents and embedded in electronic communications sent to team members.

Later, a research nurse at one of the participating hospitals needs to access patient information from the clinical trial. Using a hospital-issued tablet with the decoding components of system 1400, she scans the QR code during morning rounds. Contextual data collection subsystem 1420 immediately gathers environmental information: GPS coordinates confirm the tablet is within hospital boundaries, network parameters verify connection to the hospital's secure Wi-Fi, device security state confirms the hospital tablet is up-to-date with security patches and encryption enabled, and authentication records confirm the nurse logged in with her credentials and fingerprint scan thirty minutes ago.

QR decoding subsystem 202 processes the QR code while context analysis engine 1410 evaluates the gathered contextual data against the embedded context policy rules. Since all requirements for security levels 1 and 2 are met, context-adaptive decoding controller 1440 authorizes decompression of the public statistical data and anonymized patient responses. However, one contextual factor for security level 3 isn't satisfied—the hospital's policy only permits access to identifiable patient information by primary care providers, and the system detects the nurse's role doesn't meet this requirement.

The nurse receives access to the first two security levels, allowing her to view aggregate results and anonymized patient responses. A notification indicates that additional data exists but requires different credentials or context. When the attending physician later scans the same QR code using his hospital device, contextual authentication verification subsystem 1450 confirms his primary care provider status, enabling access to all three security levels including identifiable patient information.

Throughout the day, as hospital staff scan the same QR code, system 1400 continuously adjusts access permissions based on changing contextual factors. During a network maintenance window when the secure hospital network temporarily goes offline, the context-adaptive decoding controller 1440 temporarily restricts access to security level 2 data even for authorized physicians, maintaining security despite changing conditions. When a researcher attempts to access the data from a coffee shop outside the hospital, the system automatically limits access to only the public statistical data regardless of the user's credentials.

Security policy management subsystem 1430 allows the hospital's information security team to monitor these access patterns and refine contextual policies as needed. They notice that legitimate after-hours access attempts by on-call physicians are being restricted, so they update the policy rules to include an exception for authenticated on-call staff. These updated policies are distributed to all devices, ensuring consistent security enforcement across the organization.

This use case demonstrates how system 1400 provides dynamic, context-aware security that goes beyond traditional static access controls, ensuring sensitive clinical trial data is protected while remaining accessible to appropriate personnel under the right circumstances.

Exemplary Computing Environment

Figure 17:
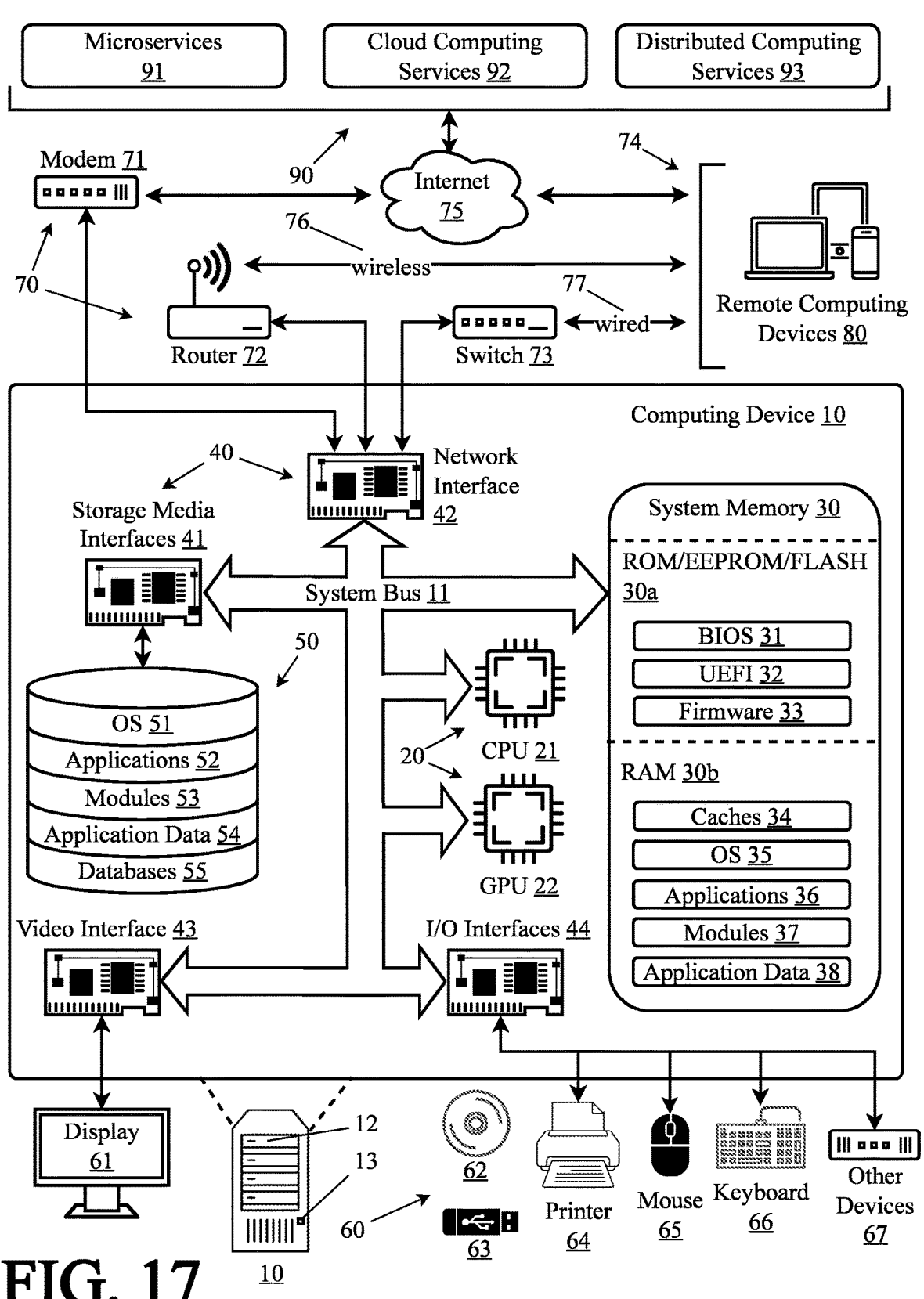
FIG. 17 illustrates an exemplary computing environment on which an embodiment described herein may be implemented, in full or in part.

FIG. 17 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions. Further, computing device 10 may comprise one or more specialized processors such as a graphics processing unit (GPU) 22 configured to accelerate processing of computer graphics and images via a large array of specialized processing cores arranged in parallel.

System memory 30 is processor-accessible data storage in the form of volatile and/or nonvolatile memory. System memory 30 may be either or both of two types: non-volatile memory and volatile memory. Non-volatile memory 30a is not erased when power to the memory is removed, and includes memory types such as read only memory (ROM), electronically-erasable programmable memory (EEPROM), and rewritable solid-state memory (commonly known as "flash memory"). Non-volatile memory 30a is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30a may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30b is erased when power to the memory is removed and is typically used for short-term storage of data for processing. Volatile memory 30b includes memory types such as random-access memory (RAM), and is normally the primary operating memory into which the operating system 35, applications 36, program modules 37, and application data 38 are loaded for execution by processors 20. Volatile memory 30b is generally faster than non-volatile memory 30a due to its electrical characteristics and is directly accessible to processors 20 for processing of instructions and data storage and retrieval. Volatile memory 30b may comprise one or more smaller cache memories which operate at a higher clock speed and are typically placed on the same IC as the processors to improve performance.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid-state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, object oriented databases, BOSQL databases, and graph databases.

Applications (also known as computer software or software applications) are sets of programming instructions designed to perform specific tasks or provide specific functionality on a computer or other computing devices. Applications are typically written in high-level programming languages such as C++, Java, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network. Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices.

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90.

In an implementation, the disclosed systems and methods may utilize, at least in part, containerization techniques to execute one or more processes and/or steps disclosed herein. Containerization is a lightweight and efficient virtualization technique that allows you to package and run applications and their dependencies in isolated environments called containers. One of the most popular containerization platforms is Docker, which is widely used in software development and deployment. Containerization, particularly with open-source technologies like Docker and container orchestration systems like Kubernetes, is a common approach for deploying and managing applications. Containers are created from images, which are lightweight, standalone, and executable packages that include application code, libraries, dependencies, and runtime. Images are often built from a Dockerfile or similar, which contains instructions for assembling the image. Dockerfiles are configuration files that specify how to build a Docker image. Systems like Kubernetes also support containers or CRI-O. They include commands for installing dependencies, copying files, setting environment variables, and defining runtime configurations. Docker images are stored in repositories, which can be public or private. Docker Hub is an exemplary public registry, and organizations often set up private registries for security and version control using tools such as Hub, JFrog Artifactory and Bintray, Github Packages or Container registries. Containers can communicate with each other and the external world through networking. Docker provides a bridge network by default, but can be used with custom networks. Containers within the same network can communicate using container names or IP addresses.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, main frame computers, network nodes, virtual reality or augmented reality devices and wearables, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP, gRPC, or message queues such as Kafka. Microservices 91 can be combined to perform more complex processing tasks.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over the Internet on a subscription basis.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

As can now be appreciated, disclosed embodiments enable improved QR code generation and decoding by using multiple compression codebooks, including a proprietary codebook, to both increase capacity and provide security in an integrated solution. While examples of disclosed embodiment utilized QR codes, disclosed embodiments can be utilized with barcodes, and/or other types of optical codes.

The skilled person will be aware of a range of possible modifications of the various aspects described above. Accordingly, the present invention is defined by the claims and their equivalents.

What is claimed is:

1. A computer system comprising a hardware memory, wherein the computer system is configured to execute software instructions stored on nontransitory machine-readable storage media that:
   classify portions of a plurality of input data into multiple security classifications;
   determine context sensitivity requirements for the classified data;
   compress the classified data using at least one public codebook and at least one private codebook based on the security classifications;
   generate an optical code incorporating the compressed data and the context sensitivity requirements;
   generate an image of the optical code;
   collect contextual data from an environment in which the optical code is scanned;
   analyze the contextual data against the context sensitivity requirements;
   decode the optical code into a combined data string;
   analyze data within the optical code to determine security classifications for different portions of the data;
   determine which security classifications are accessible based on the contextual data analysis;
   selectively decode portions of the data using codebooks corresponding to the accessible security level classifications; and
   combine the selectively decoded portions into an uncompressed data string.

2. The computer system of claim 1, wherein the contextual data comprises at least one of: location data, network environment data, device security data, and user behavioral data.

3. The computer system of claim 1, wherein the computer system is further configured to:
   compute a hash value based on the classified data and the context sensitivity requirements;
   incorporate the hash value into the encoded optical code; and
   authenticate decoded data by comparing the hash value with a recomputed hash of the decoded data.

4. The computer system of claim 1, wherein determining which security classifications are accessible comprises applying a weighted scoring algorithm to multiple contextual factors to determine a composite security confidence level.

5. The computer system of claim 1, wherein the computer system is further configured to:
   identify codebook locations within the encoded optical code;
   retrieve codebooks from the identified locations; and
   utilize the retrieved codebooks to decompress corresponding portions of the encoded data.

6. The computer system of claim 1, wherein the computer system is further configured to dynamically adjust access to different security classifications during a session based on changes in the contextual data.

7. The computer system of claim 1, wherein the computer system is further configured to maintain an audit log of access decisions based on contextual data analysis.

8. The computer system of claim 1, wherein the optical code comprises at least one of a QR code, a bar code, a data matrix code, and an Aztec code.

9. A computer-implemented method for generating and decoding multi-level security optical codes, comprising:
   classifying portions of a plurality of input data into multiple security classifications;
   determining context sensitivity requirements for the classified data;
   compressing the classified data using at least one public codebook and at least one private codebook based on the security classifications;
   generating an optical code incorporating the compressed data and the context sensitivity requirements;
   generating an image of the optical code;
   collecting contextual data from an environment in which the optical code is scanned;
   analyzing the contextual data against the context sensitivity requirements;
   decoding the optical code into a combined data string;
   analyzing data within the optical code to determine security classifications for different portions of the data;
   determining which security classifications are accessible based on the contextual data analysis;
   selectively decoding portions of the data using codebooks corresponding to the accessible security level classifications; and
   combining the selectively decoded portions into an uncompressed data string.

10. The computer-implemented method of claim 9, wherein the contextual data comprises at least one of: location data, network environment data, device security data, and user behavioral data.

11. The computer-implemented method of claim 9, further comprising:
   computing a hash value based on the classified data and the context sensitivity requirements;
   incorporating the hash value into the encoded optical code; and
   authenticating decoded data by comparing the hash value with a recomputed hash of the decoded data.

12. The computer-implemented method of claim 9, wherein determining which security classifications are accessible comprises applying a weighted scoring algorithm to multiple contextual factors to determine a composite security confidence level.

13. The computer-implemented method of claim 9, further comprising:
   identifying codebook locations within the encoded optical code;
   retrieving codebooks from the identified locations; and
   utilizing the retrieved codebooks to decompress corresponding portions of the encoded data.

14. The computer-implemented method of claim 9, further comprising dynamically adjusting access to different security classifications during a session based on changes in the contextual data.

15. The computer-implemented method of claim 9, further comprising maintaining an audit log of access decisions based on contextual data analysis.

16. The computer-implemented method of claim 9, wherein the optical code comprises at least one of a QR code, a bar code, a data matrix code, and an Aztec code.

\*  \*  \*  \*  \*